United States Patent [19]
Obata

[11] Patent Number: 5,335,319
[45] Date of Patent: Aug. 2, 1994

[54] POLYGON DIVISION METHOD AND APPARATUS

[75] Inventor: Koei Obata, Kusatsu, Japan

[73] Assignee: Daikin Industries, Ltd., Japan

[21] Appl. No.: 794,484

[22] Filed: Nov. 19, 1991

[30] Foreign Application Priority Data

Nov. 20, 1990 [JP] Japan .................. 2-317138

[51] Int. Cl.$^5$ .................. G06F 15/62
[52] U.S. Cl. .................. 395/141; 395/133
[58] Field of Search .................. 395/133, 141, 142; 340/728, 747, 750; 345/118

[56] References Cited

U.S. PATENT DOCUMENTS

| 4,815,009 | 3/1989 | Blatin | 364/518 |
| 4,951,227 | 8/1990 | Todel | 364/518 |
| 5,129,051 | 7/1992 | Cain | 396/133 |

FOREIGN PATENT DOCUMENTS 212774 3/1987 European Pat. Off. .

OTHER PUBLICATIONS

A. Fournier et al, "Triangulating Simple Polygons and Equivalent Problems", *ACM Trans. On Graphics*, vol. 3, No. 2, New York, pp. 153–174 (Apr. 1984).

*Primary Examiner*—Phu K. Nguyen
*Attorney, Agent, or Firm*—Beveridge, DeGrandi, Weilacher & Young

[57] ABSTRACT

A polygon division method, and polygon division apparatus are disclosed for dividing polygons according to a basic judgement as to whether each apex of the polygon is concave or convex. According to the claimed method, and what is carried out by the claimed apparatus, each apex of a polygon is judged as to whether it is concave or convex. The total number of apexes of the polygon is stored. A first convex apex is selected, whereupon a judgement is made as to whether another apex is present in the interior of a triangle that is formed by two sides which unite at the selected convex apex and a line segment that interconnects the ends of such sides. If no other apex is presence in the interior of such triangle, the triangle is cut from the polygon. Otherwise, a different convex apex is chosen. Further, the method and apparatus could include selection of convex apexes based upon whether the convex apexes overlap other apexes. Also, according to the invention, polygon division can be terminated if, during the division, it is determined that an apex has changed from convex to concave during the division.

6 Claims, 28 Drawing Sheets

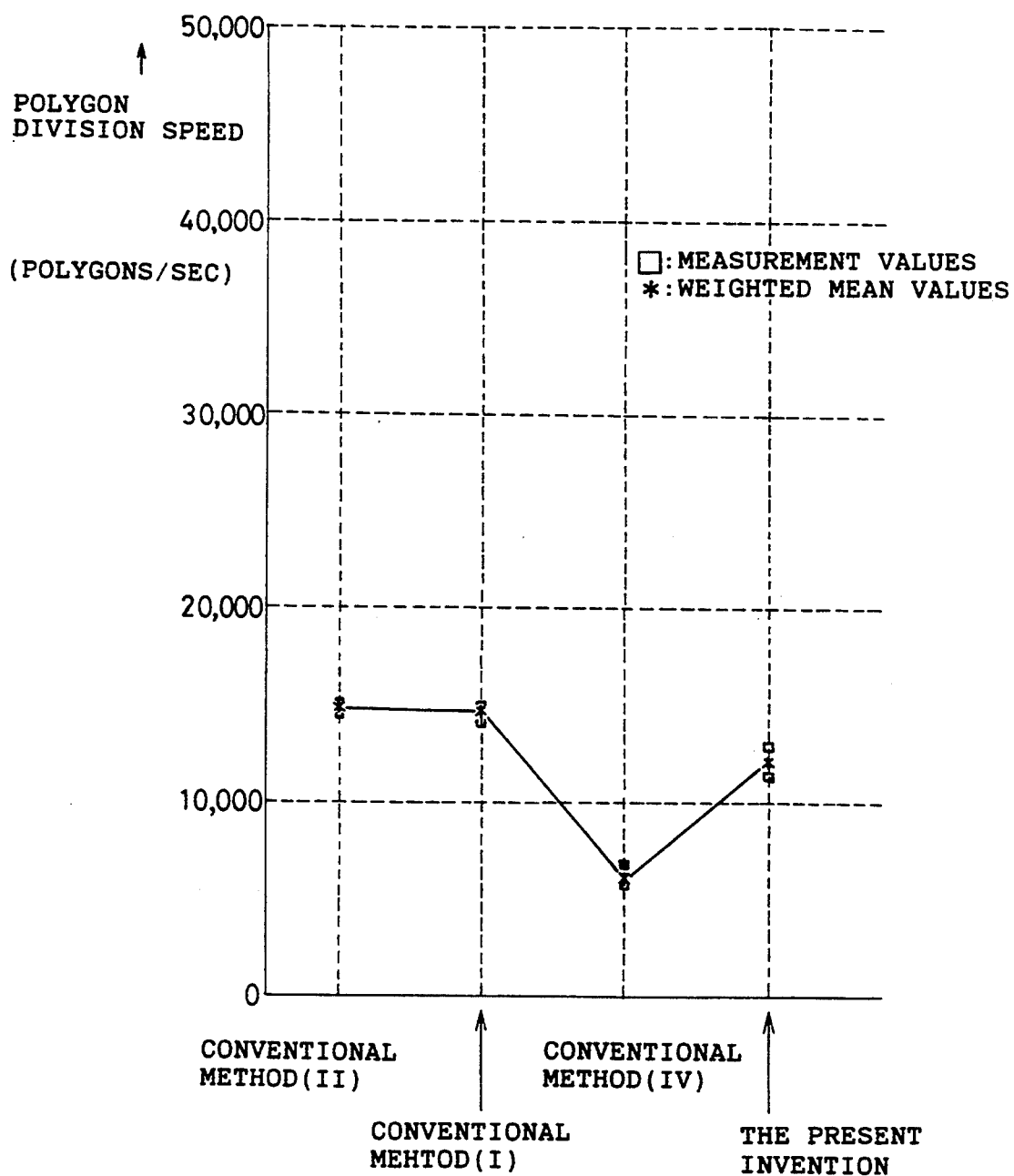

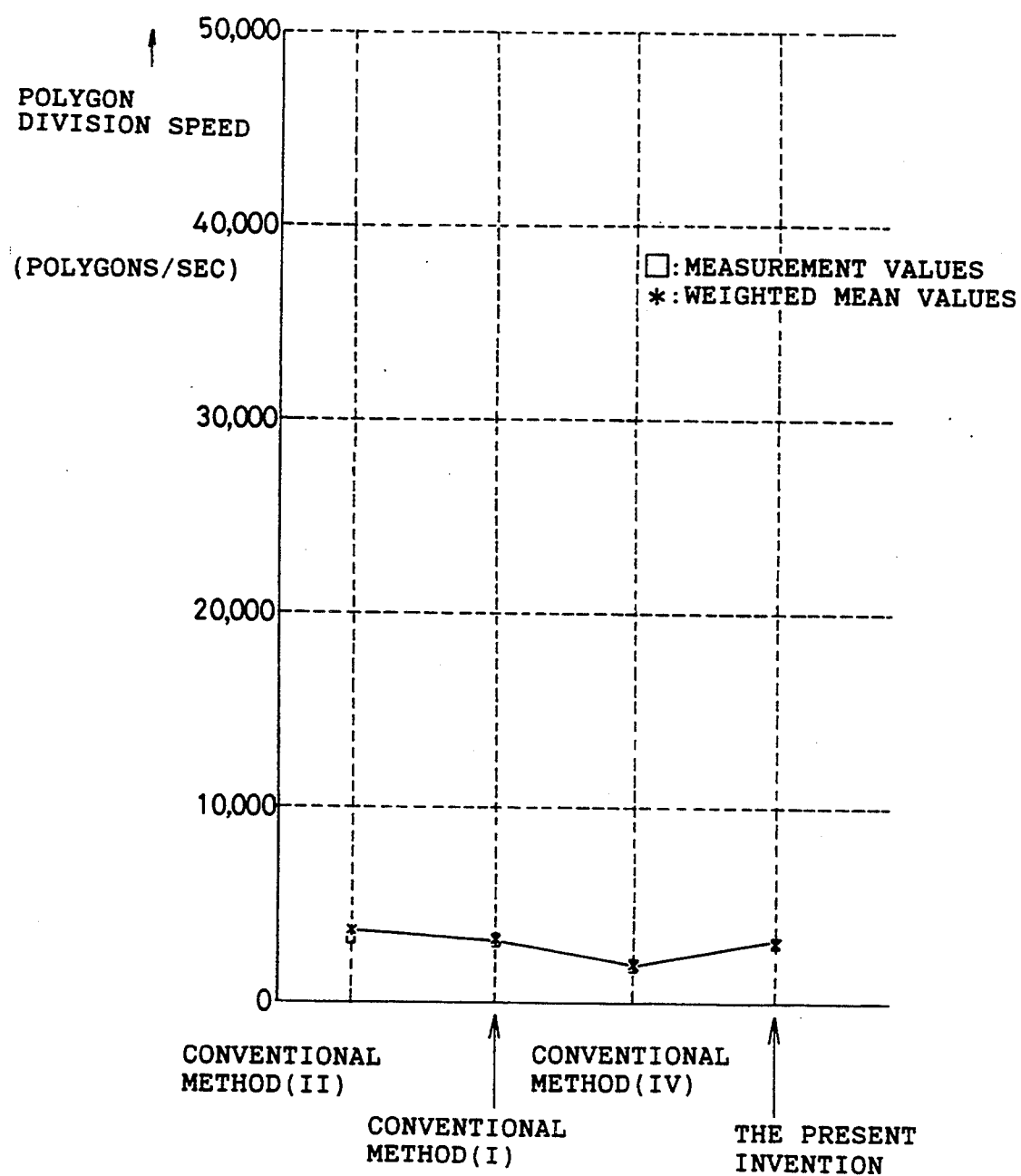

Fig. 13 (A) (PRIOR ART)
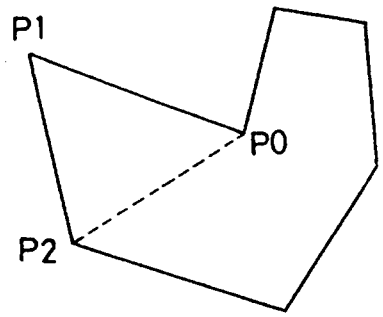
Fig. 13 (B)(PRIOR ART)
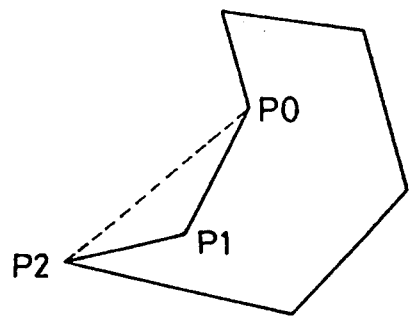
Fig 13 (C)(PRIOR ART)
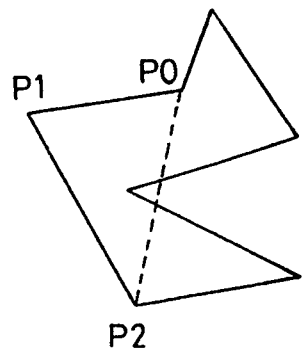

Fig. 15 (A) (PRIOR ART)
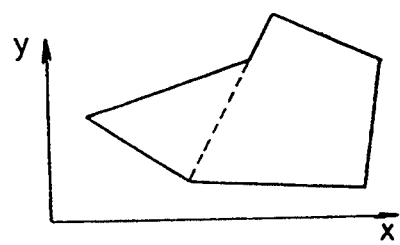
Fig. 15 (B) (PRIOR ART)
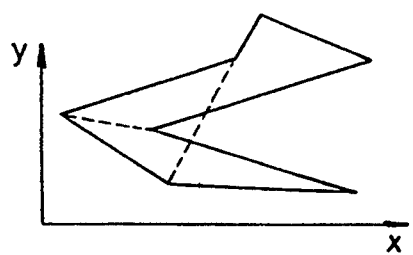

FIG. 19(A) (PRIOR ART)
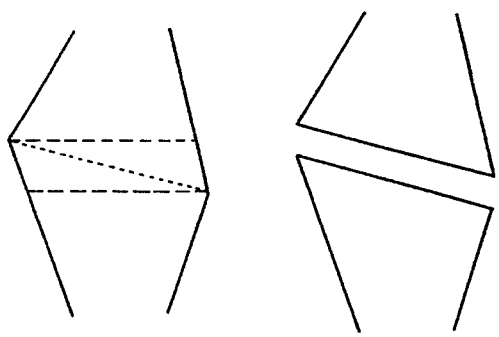
FIG. 19(B) (PRIOR ART)
FIG. 19(C) (PRIOR ART)
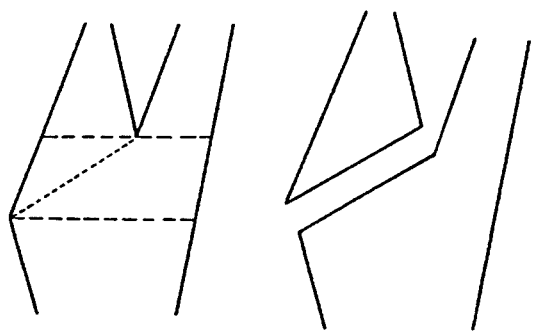
FIG. 19(D) (PRIOR ART)

FIG. 20(A) (PRIOR ART)
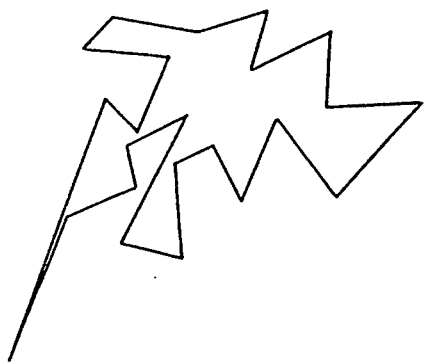
FIG. 20(B) (PRIOR ART)
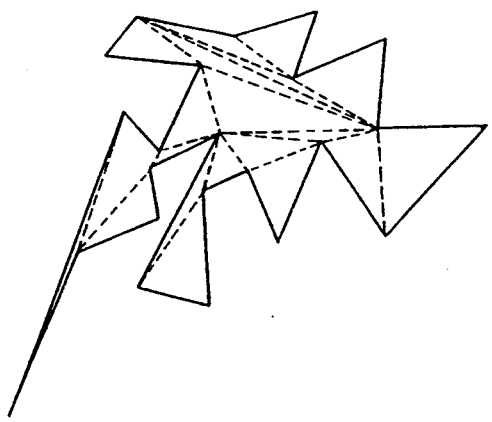
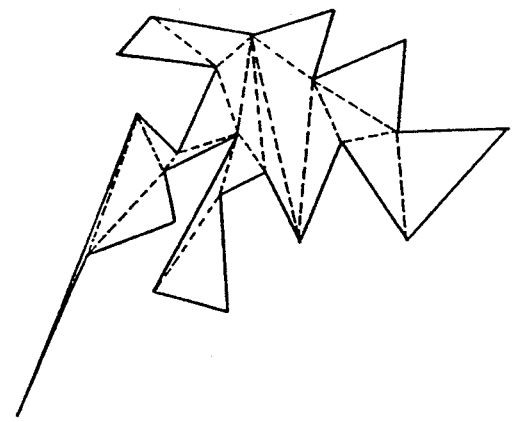
FIG. 20(C) (PRIOR ART)

FIG. 21(A) (PRIOR ART)
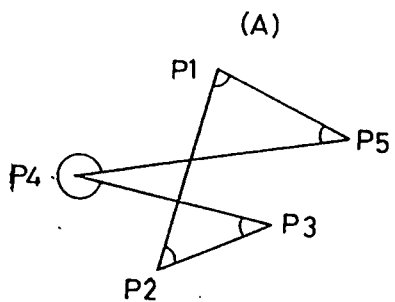
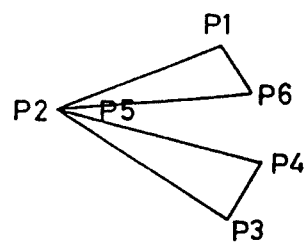
FIG. 21(B) (PRIOR ART)
FIG. 21(C) (PRIOR ART)
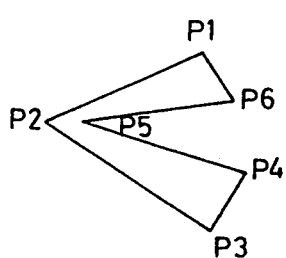
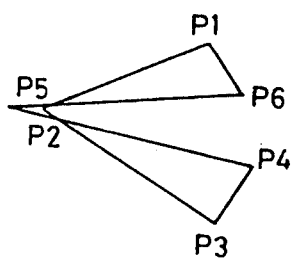
FIG. 21(D) (PRIOR ART)

FIG. 22(A) (PRIOR ART)
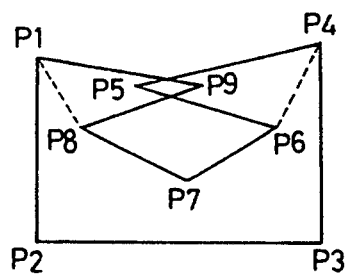
FIG. 22(B) (PRIOR ART)
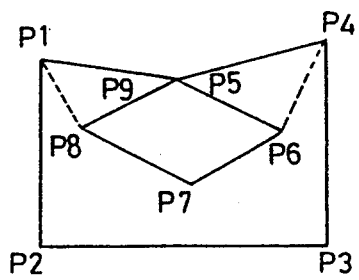
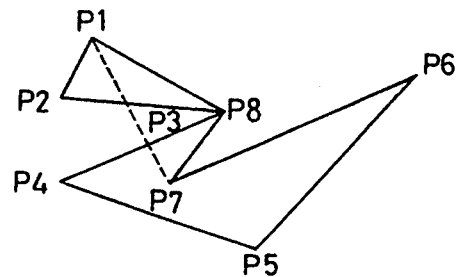
FIG. 22(C) (PRIOR ART)

POLYGON DIVISION METHOD AND APPARATUS

BACKGROUND OF THE INVENTION

The present invention relates to polygon division methods and apparatus, and more particularly, to methods and apparatus for dividing a polygon having an arbitrary shape into triangles which are convex polygons having the simplest construction.

In a graphics display apparatus, it is strongly required that filling and displaying of polygons, each having an arbitrary shape, are to be performed at high speed. To satisfy the requirement, polygon division methods, each method being carried out prior to the filling and displaying, are proposed for dividing a concave polygon into plural triangles which are convex polygons having the simplest construction. The concave polygon has at least one apex having an interior angle greater than 180 degrees, while the convex polygon has no apex having an interior angle greater than 180 degrees.

Conventional polygon division methods are (I) a method for sequentially cutting triangles from a polygon by determining a concave apex as a reference apex, the concave apex having an interior angle greater than 180 degrees, (II) a method which uses jointly a triangle cutting method with a division method for dividing a polygon into two parts, (III) a trapezoid division method and (IV) a method for dividing a polygon at apexes using the trapezoid division method.

The method (I) is shown by a flowchart in FIG. 12.

In step SP1, concave apexes are extracted from all apexes of a polygon and a concave apex list is formed based on the extracted concave apexes. In step SP2, the concave apex list is searched to find the concave apex, then it is judged whether or not at least one concave apex exists. When it is judged in step SP2 that no concave apex exists, then in step SP3, triangles are sequentially cut from the polygon by determining an arbitrary convex apex as a reference apex. Thereafter, division of the polygon is finished. On the contrary, when it is judged in step SP2 that at least one concave apex exists, then in step SP4, an arbitrary concave apex is taken out from the concave apex list and is determined to be a reference apex P0. In step SP5, two apexes P1 and P2 are taken out from all the apexes of the polygon, the apexes P1 and P2 are sequential with respect to the reference apex P0 in a predetermined direction (for example, in a counter-clockwise direction). In step SP6, it is judged whether or not the apex P1 is a convex apex. When it is judged in step SP6 that the apex P1 is a convex apex, in step SPT, it is judged whether or not another apex exists in the interior of the triangle which is formed by the three apexes P0, P1 and P2. When it is judged in step SP7 that no apex exist in the interior of the triangle, in step SP8, the triangle is cut from the polygon. In step SP9, it is judged whether or not the concave apex has been varied to a convex apex following the cutting of the triangle. When it is judged in step SP9 that the concave apex has not been varied to a convex apex, the processing in step 5 is carried out again while maintaining the reference apex as it is. That is, the following apexes are taken out. On the contrary, when it is judged in step SP9 that the concave apex has been varied to a convex apex, in step SP10, the next concave apex is taken out from the concave apex list and is determined to be the reference apex P0. Then, the processing in step 5 is carried out again based on the newly determined reference apex.

When it is judged in step SP6 that the apex P1 is a concave apex, or it is judged in step SP7 that another apex exists in the interior of the triangle which is formed by the three apexes P0, P1 and P2, in step SP11, two apexes are taken out as the apexes P1 and P2 from all the apexes of the polygon, the apexes are sequential with respect to the reference apex P0 in the reverse direction (for example, in a clockwise direction). In step SP12, it is judged whether or not the newly taken out apex P1 is a convex apex. When it is judged in step SP12 that the apex P1 is a convex apex, in step SP13, it is judged whether or not another apex exists in the interior of the triangle which is formed by the three apexes P0, P1 and P2. When it is judged in step SP7 that no apex exists in the interior of the triangle, the processing in step SP8 is carried out. When it is judged in step SP12 that the apex P1 is a concave apex, or it is judged in step SP13 that another apex exists in the interior of the triangle which is formed by the three apexes P0, P1 and P2, in step SP14, the reference apex P0 is placed back to the end of the concave apex list. In step SP15, the next concave apex is taken out from the concave apex list, and is determined to be the new reference apex. Then, the processing in step SP5 is carried out again.

When the polygon having a shape illustrated in FIG. 13(A) is to be divided into plural triangles, only one concave apex is determined to be the reference apex. Plural triangles are sequentially cut from the polygon in a counter-clockwise direction. When a polygon having the shape illustrated in FIG. 13(B) is to be divided into plural triangles, plural triangles are sequentially cut from the polygon in a clockwise direction. Even when a polygon having the shape illustrated in FIG. 13(C) is to be divided into plural triangles, plural triangles are sequentially cut from the polygon in a clockwise direction.

The method (II) is shown by a flowchart in FIG. 14.

In step SP1, apexes of a polygon are sorted in a predetermined direction (for example, in a x-coordinate direction). In step SP2, it is judged whether or not another apex exists in the interior of a triangle formed by two edges which unite an apex existing at the end of the polygon (hereinafter referred to as end apex). When it is judged in step SP2 that no apex exists in the interior of the polygon, in step SP3, the triangle is cut from the polygon. Then, the processing in step SP1 is carried out again for the remaining apexes. On the contrary, when it is judged in step SP2 that another apex exists in the interior of the polygon, in step SP4, the polygon is divided into two divided polygons with respect to the end apex and an apex in the interior of the triangle and at the closest position with respect to the end apex. Then the series of operations are carried out for each divided polygon.

When the polygon having the shape illustrated in FIG. 15(A) is to be divided into plural triangles, triangles are sequentially cut from the polygon without dividing the polygon. When the polygon having the shape illustrated in FIG. 15(B) is to be divided into plural triangles, the polygon is divided into two divided polygons, then triangles are sequentially cut from each divided polygon in a manner similar to the polygon illustrated in FIG. 15(A).

The method (III) is shown by a flowchart in FIG. 16.

In step SP1, the apexes of a polygon are sorted in a predetermined direction (for example, in a y-coordinate direction). In step SP2, a list for pseudo-trapezoids is formed, a pseudo-trapezoid being determined by its upper edge and side edges and not being determined by its lower edge, and apexes of the polygon are classified into corresponding types. In step SP3, apexes are sequentially extracted in the sorted order. In step SP4, the extracted apex is recognized by its type and a corresponding pseudo-trapezoid is extracted. In step SP5, a trapezoid is formed by determining a scanning line as the lower edge, the scanning line passing through the extracted apex. In step SP6, the formed trapezoid is divided into two triangles by a diagonal line. In step SPT, a new pseudo-trapezoid is registered in the list, the new pseudo-trapezoid being formed by dividing the trapezoid. Then the series of operations are carried out again.

When a polygon having a shape illustrated in FIG. 17 is to be divided into plural triangles, the polygon is divided into plural trapezoids by the scanning lines, each scanning line passing through a corresponding apex, then each trapezoid is divided into two portions by a diagonal line so as to perform division of the polygon into plural triangles.

The method (IV) is shown by a flowchart in FIG. 18.

In step SP1, a pseudo-trapezoid which is to be divided from a polygon is searched at every apex, similarly to the method (III), and an apex list which stores apexes for generation of upper and lower edges of a trapezoid is formed. In step SP2, a pseudo-trapezoid list is searched at every apex in a predetermined direction (for example, in a clockwise direction) with respect to an apex of the polygon, and a pseudo-trapezoid is found, the apex of the pseudo-trapezoid for forming the upper edge being incident to the presently selected apex. In step SP3, it is judged whether or not a below apex corresponding to the apex forming the upper edge is a diagonal apex. The diagonal apex is used to express the relationship between the apex forming the upper edge and the apex forming the lower edge when both apexes exist on different edge lines of the polygon. When it is judged in step SP3 that the below apex is a diagonal apex, in step SP4, the polygon is divided into two portions by the diagonal apexes. In step SP5, it is judged whether or not all polygons including divided polygons are not impossibly divided. When it is judged in step SP3 that the below apex is not a diagonal apex, the processing in step SP2 is carried out for searching the following trapezoid list. When it is judged in step SP5 that at least one polygon can possibly be divided, the series of operations above-mentioned are carried out again. On the contrary, when it is judged in step SP5 that all polygons can not be divided, the divided polygon is a polygon which monotonously descends from the apex having the maximum y-coordinate value (hereinafter referred to as maximum apex) to the apex having the minimum y-coordinate value (hereinafter referred to as minimum apex) and in which the maximum apex and the minimum apex are neighhbouring one another (hereinafter the polygon is referred to as the uni-monotone polygon). In step SP6, three apexes (including the maximum apex and the minimum apex) are extracted in a predetermined direction (for example, in a clockwise direction) with respect to the maximum apex or the minimum apex, depending on whether the side edge formed by the maximum apex and the minimum apex is in the left side or the right side. In step SP7, it is judged whether or not the angle formed by the three apexes is a convex angle. When it is judged in step SP7 that the angle is a convex angle, in step SP8, the triangle formed by the three apexes is cut from the polygon. When it is judged in step SP7 that the angle is a concave angle, or the processing in step SP8 is carried out, in step SP9, three apexes are extracted with respect to the next apex. Then the processing in step SP6 is carried out again.

When the polygon having a partial shape illustrated in FIGS. 19(A) and 19(C) is to be divided into plural triangles, the polygon is divided into plural divided polygons by the diagonal apexes as are illustrated in FIGS. 19(B) and 19(D) to obtain plural uni-monotone polygons. The uni-monotone polygon is easily divided into triangles. FIGS. 20(A) through 20(E) are diagrams illustrating triangle division results obtained by the conventional methods, respectively. Wherein, FIG. 20(A) illustrates an original polygon, FIG. 20(B) illustrates the triangle division result by the method (I), FIG. 20(C) illustrates the triangle division result by the method (II), FIG. 20(D) illustrates the triangle division result by the method (III), and FIG. 20(E) illustrates the triangle division result by the method (IV).

The method (III) generates new apexes because the method generates trapezoids based on scanning lines which pass through corresponding apexes and divides each generated trapezoid into two triangles. Consequently, an obtained triangle is deformed when the calculation accuracy for generating a new apex is not improved to a sufficient accuracy. Also, depth values and color values may include errors in matching portions of neighbouring triangles and a vacant portion may be generated between neighbouring triangles.

The disadvantages above-mentioned do not arise in the methods (I), (II) and (IV) because these methods do not generate new apexes.

The disadvantage arises in the methods (I), (II), (III) and (IV) that operations are very complicated, quantities of software programs are large, and the quantity of data becomes large because of the quantity of information which is necessary for dividing a polygon into plural triangles. A polygon in which edges intersect one another (hereinafter referred to as a self-interference polygon) and a polygon in which plural apexes overlap one another at one point (hereinafter referred to as a degeneracy polygon) may not be divided into plural triangles properly.

More specifically, the methods (II) and (IV) sort apexes with respect to the x-coordinate or y-coordinate, then perform operations by determining the minimum apex as a starting apex. This is because both methods employ a prerequisite that the minimum apex must be a convex apex. When a polygon is a self-interference polygon as is illustrated in FIG. 21(A) for example, the minimum apex is a concave apex and the prerequisite is not satisfied. The methods (II) and (IV) are not applicable to self-interference polygons. When a polygon is a degeneracy polygon as is illustrated in FIG. 21(B), a convex apex and a concave apex overlap at a minimum point, thereby the minimum point may be recognized as a convex apex as is illustrated in FIG. 21(C) Or may be recognized as a concave apex as is illustrated in FIG. 21(D) depending on the sort result. This disadvantage is impossible to the solve essentially because there is no information showing the relationship between the apexes.

The method (I) is impossible to cut triangles from a polygon which is a self-interference polygon as is illustrated in FIG. 22(A) for example. When a polygon is a degeneracy polygon as is illustrated in FIG. 22(B), it is impossible to cut a triangle from the polygon under the condition that an overlap apex is recognized to exist in the interior of a triangle which is to be cut. Of course in this case, the triangle can be cut when an overlap apex is recognized to exist exterior to the triangle. When a polygon is a degeneracy polygon as is illustrated in FIG. 22(C), even though an overlap apex is recognized to exist at the exterior of a triangle which is to be cut, a triangle with its one edge illustrated by a dashed line in FIG. 22(C) is cut from the polygon. This makes it impossible to cut proper triangles.

SUMMARY OF THE INVENTION

It is an object of the present invention to decrease the quantity of data for cutting triangles from a polygon.

It is another object of the present invention to simplify the triangle cutting operation.

It is a further object of the present invention to deal with a self-interference polygon and a degeneracy polygon easily.

To perform the objects above-mentioned, a first polygon division method according to the present invention comprises the steps of;

judging for all apexes of a polygon whether each apex is a concave apex or a convex apex;

obtaining a number of apexes of the polygon, selecting one convex apex;

judging whether or not another apex exists in an interior of a triangle which is formed by two sides uniting at the convex apex and a line segment interconnecting the ends of the sides;

cutting the triangle from the polygon, decrementing the number of apexes, and selecting another convex apex on a remaining polygon formed by cutting the triangle, when it is judged that no apex exists in the interior of the triangle; and selecting a different convex apex when it is judged that another apex exists in the interior of the triangle.

When this polygon division method is employed, an arbitrary convex apex is selected from all apexes of a polygon, then it is judged whether or not another apex exists in the interior of a triangle which is formed by two sides uniting at the convex apex and a line segment interconnecting the ends of the sides. When it is judged that no apex exists in the interior of the triangle, the triangle is cut from the polygon and the number of apexes is decremented. Then, the series of operations is carried out for the remaining polygon. On the contrary, when it is judged that another apex exists in the interior of the polygon, another convex apex is selected, then the judging operation for judging whether or not still another apex exists in the interior of the polygon is repeated.

As is apparent from the foregoing, a sorting operation for all apexes of a polygon is not needed at all, thereby a polygon is divided into plural triangles by simplified operations. Also, the method decreases the quantity of data because only data indicative of whether each apex is a concave apex or a convex apex are needed besides the apex data.

A first polygon division apparatus according to the present invention comprises;

apex judging means for judging whether each apex of a polygon is a concave apex or a convex apex;

apex number holding means for holding a number of apexes of the polygon;

first convex apex selection means for selecting one convex apex;

triangle judging means for judging whether or not another apex exists in an interior of a triangle which is formed by two sides uniting at the selected convex apex and a line segment interconnecting the ends of the sides;

triangle cutting means for cutting the triangle from the polygon, for decrementing the number of apexes of the polygon and for selecting another convex apex on a remaining polygon formed by cutting the triangle, based on the judgement result from the triangle judging means indicating that no apex exists in the interior of the triangle; and second convex apex selection means for selecting a different convex apex based on the judgement result from the triangle judging means indicating that another apex exists in the interior of the triangle.

When this apparatus is employed, all apexes of a polygon are judged by the apex judging means as to whether each apex is a concave apex or a convex apex, and the number of apexes of the polygon is held by the apex number holding means. An arbitrary convex apex is selected from all apexes of the polygon by the first convex apex selection means, then it is judged by the triangle judging means whether or not another apex exists in the interior of a triangle which is formed by two sides uniting at the convex apex and a line segment interconnecting the other ends of the sides. When it is judged by the triangle judging means that no apex exists in the interior of the triangle, the triangle is cut from the polygon and the number of apexes is decremented by the triangle cutting means. Then the series of operations is carried out for the remaining polygon. On the contrary, when it is judged by the triangle judging means that another apex exists in the interior of the triangle, a different convex apex is selected by the second convex apex selection means, then the judging operation by the triangle judging means is repeated.

As is apparent from the foregoing, a polygon is easily divided into plural triangles by merely operating the triangle cutting means or the second convex apex selecting means selectively, depending on the judgement result as to whether or not another apex exists in the interior of the triangle which is formed by two sides uniting at the convex apex and a line segment interconnecting the ends of the sides.

A second polygon division method according to the present invention comprises the steps of;

judging for all apexes of a polygon whether each apex is a concave apex or a convex apex;

obtaining a number of apexes of the polygon, detecting apexes which overlap one another;

selecting one convex apex from apexes other than the overlapped apexes;

judging whether or not another apex exists in an interior of a triangle which triangle is formed by two sides uniting at the convex apex and a line segment interconnecting the ends of the sides;

cutting the triangle from the polygon, decrementing the number of apexes, and selecting another convex apex on a remaining polygon formed by cutting the first triangle, when it is judged that no apex exists in the interior of the triangle; and selecting a different convex apex from the apexes other than the overlapped apexes when it is judged that another apex exists in the interior of the triangle;

selecting a convex apex which does not include any concave apex therein, judging whether or not another apex exists in an interior a triangle which is formed by two sides uniting at the selected overlapping convex apex and a line segment interconnecting the ends of the sides and cutting the triangle from the polygon when it is possible to cut the triangle, when division of the polygon is not completed by the selecting of the convex apexes other than the overlapping apexes; and repeating the selection operation for selecting another convex apex and the judging operation for judging whether or not another apex exists in the interior of the triangle, or the apex judging operation, the detection operation for overlap apexes, the convex apex selection operation and the judging operation for judging whether or not another apex exists in an interior of the triangle for a remaining polygon.

When this method is employed, the overlap apexes are supposed to be at the exterior of the polygon which is to be cut for a degeneracy polygon, and triangles are cut from the polygon by the operations in the first polygon division method, except for the overlap apexes. Only when division of a polygon is not completed by the method, a convex apex which includes no concave apex therein is selected, a triangle based on the selected convex apex is judged as to whether another apex exists in the interior of the polygon, then the triangle is cut from the polygon when it is possible. Thereafter, selection of another convex apex and judgement for judging whether or not the convex apex includes a concave apex therein are repeated, or judgement for judging whether each apex is a convex apex or concave apex, detection of overlap apexes, selection of a convex apex and judgement for judging whether or not the convex apex includes a concave apex therein are repeated for the remaining polygon.

As is apparent from the foregoing, most degeneracy polygons are divided into plural triangles by the first polygon division method. Even when division of a polygon is not completed by the first polygon division method, a remaining polygon is completely divided into plural triangles by selecting a convex apex which includes no concave apex therein.

A second polygon division apparatus according to the present invention comprises;

apex judging means for judging whether each apex of a polygon is a concave apex or a convex apex;

apex number holding means for holding a number of apexes of the polygon;

detection means for detecting overlap apexes which overlap one another;

first convex apex selection means for selecting one convex apex from all polygon apexes except for the overlap apexes;

triangle judging means for judging whether or not another apex exists in an interior of a triangle which is formed by two sides uniting at the selected convex apex and a line segment interconnecting the ends of the sides;

triangle cutting means for cutting the triangle from the polygon, for decrementing the number of apexes of the polygon and for selecting another convex apex on a remaining polygon formed by cutting the triangle, based on the judgement result from the triangle judging means indicating that no apex exists in the interior of the triangle;

second convex apex selection means for selecting a different convex apex based on the judgement result from the triangle judging means indicating that another apex exists in the interior of the triangle; and overlap apex selection means for selecting a convex apex which includes no concave apexes therein and for operating a judging operation by the triangle judging means when convex apexes other than the overlapping convex apexes have been sequentially selected and the polygon is incompletely divided.

When this apparatus is employed, overlap apexes are detected by the detection means. At first, triangles are cut from the polygon similar to the first polygon division apparatus for all apexes except the detected overlap apexes. When triangles are incompletely cut by selecting convex apexes sequentially from all apexes except the detected overlap apexes, convex apexes which include no concave apex therein are sequentially selected by the overlap apex selection means and triangles are sequentially judged by the triangle judging means as to whether or not another apex exists in the interior of each triangle. Thereby, triangles are cut from the remaining polygon which is obtained by performing the operations similar to the operations of the first polygon division apparatus.

A third polygon division method according to the present invention comprises the steps of;

judging whether or not an apex exists which has varied from a convex apex to a concave apex at every cutting of a triangle from a polygon;

continuing division of the polygon when it is judged that no apex exists which has varied from a convex apex to a concave apex; and forcibly terminating division of the polygon when it is judged that an apex exists which has varied from a convex apex to a concave apex.

When this method is employed, it is judged whether or not an apex exists which has varied from a convex apex to a concave apex at every cutting of a triangle from a polygon. When it is judged that no apex exists which has varied from a convex apex to a concave apex, division of the polygon is repeated as it is because the polygon is not a self-interference polygon, On the contrary, when it is judged that an apex exists which has varied from a convex apex to a concave apex, division of the polygon is forcibly terminated because the polygon is a self-interference polygon.

As is apparent from the foregoing, a polygon is easily discriminated as to whether or not the polygon is a self-interference polygon, and the division of the polygon is forcibly terminated when the polygon is a self-interference polygon.

A third polygon division apparatus according to the present invention comprises;

apex judging means for judging whether each apex of a polygon is a concave apex or a convex apex;

apex number holding means for holding a number of apexes of the polygon;

convex apex selection means for selecting one convex apex among all apexes of the polygon;

triangle judging means for judging whether or not another apex exists is an interior of a triangle which is formed by two sides uniting at a selected convex apex and a line segment interconnecting the ends of the sides;

triangle cutting means for cutting the triangle from the polygon and for decrementing the number of apexes of the polygon based on the judgement result from the triangle judging means indicating that no apex exists in the interior of the triangle;

varied apex judging means for judging whether not an apex has varied from a convex apex to a concave apex at every cutting of a triangle from a polygon;

first repetition control means for repetitively operating the apex judging means, the apex number holding means, the convex apex selection means and the triangle judging means for a remaining polygon which is formed by cutting the triangle from the polygon based on the judgement result from the varied apex judging means indicating that no apex exists which has varied from a convex apex to a concave apex;

second repetition control means for repetitively operating the convex apex selection means and the triangle judging means based on the judgement result from the triangle judging means indicating that another apex exists in the interior of the triangle; and forcibly terminating means for forcibly terminating division of the polygon based on the judgement result from the varied apex judging means indicating that an apex exists which has varied from a convex apex to a concave apex.

When this apparatus is employed, it is judged by the varied apex judging means whether or not an apex exists which has varied from a convex apex to a concave apex at every cutting of a triangle from a polygon. The polygon is discriminated based on the judgement result from the varied apex judging means as to whether or not the polygon is a self-interference polygon. The division of the polygon is forcibly terminated by the forcibly terminating means when the polygon is discriminated as a self-interference polygon. On the contrary, the division of the polygon is repeated as it is when the polygon is not discriminated as a self-interference polygon.

As is apparent from the foregoing, a polygon is easily discriminated as to whether or not the polygon is a self-interference polygon, and the division of the polygon is forcibly terminated when the polygon is a self-interference polygon.

These and other objectives, features and advantages of the present invention will be more readily understood upon consideration of the present invention, taken into conjunction with the accompanying drawings.

BRIEF DESCRIPTION OF THE DRAWINGS

FIGS. 13(A) to 13(G) are diagrams illustrating a specific sample of the conventional polygon division method (I);

FIGS. 15(A) and 15(B) are diagrams illustrating a specific sample of the conventional polygon division method (II);

FIGS. 19(A) to 19(D) are diagrams illustrating a specific sample of the conventional polygon division method (IV); and FIGS. 20(A) to 20(E) are diagrams illustrating polygon division results obtained by the conventional polygon division methods;

FIGS. 21(A) to 21(D) are diagrams useful in understanding the disadvantages in the conventional polygon division methods; and FIGS. 22(A) to 22(C) are further diagrams useful in understanding the disadvantages in the conventional polygon division methods.

DETAILED DESCRIPTION OF THE PREFERRED EMBODIMENTS

Figure 1:
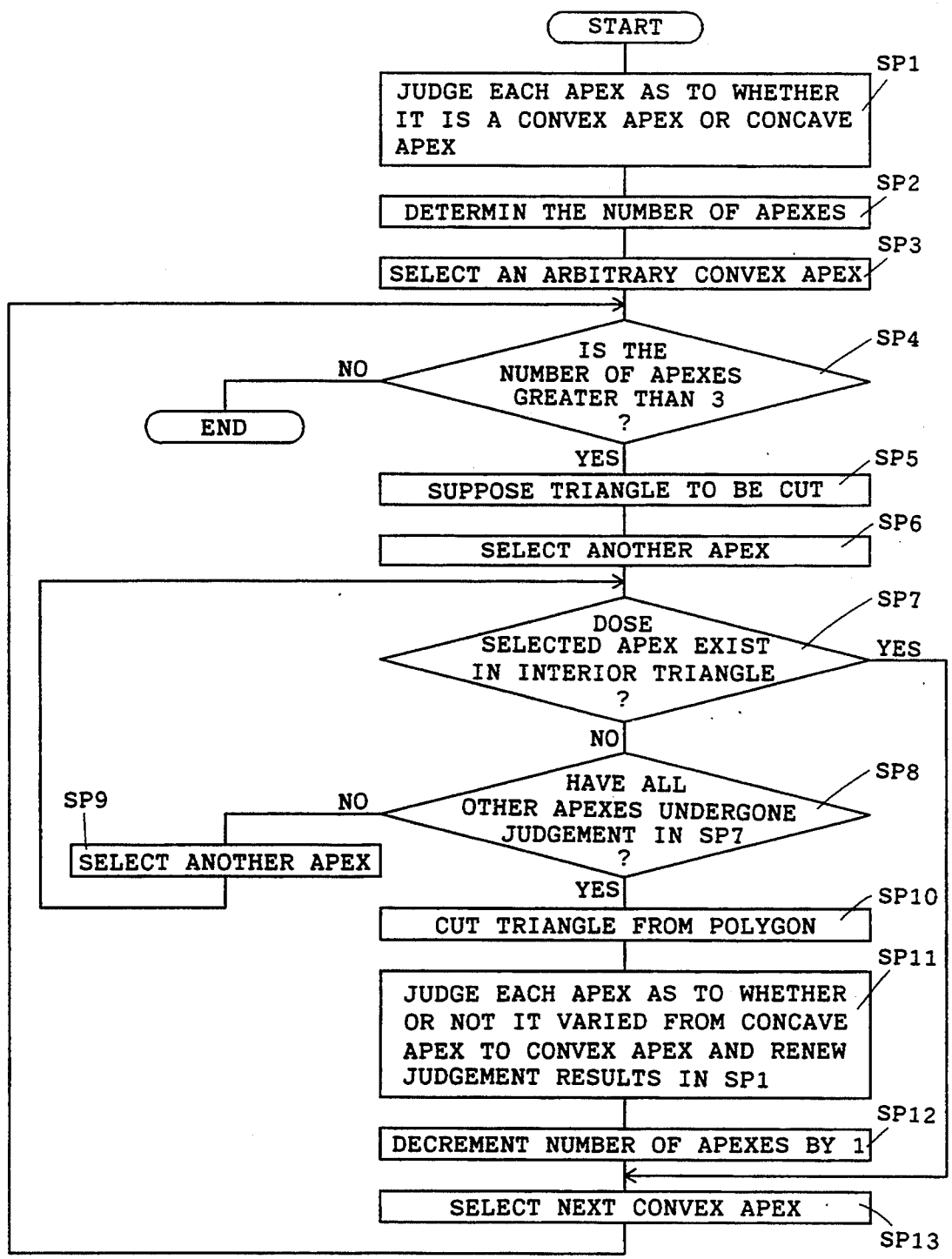
FIG. 1 is a flowchart illustrating a first embodiment of the polygon division method in accordance with the present invention.

FIG. 1 is a flowchart illustrating a first embodiment of the polygon division method in accordance with the present invention.

In step SP1, it is judged for all apexes of a polygon which is to be divided into plural triangles, whether each apex is a concave apex (a concave apex having an inner angle less than 180 degrees) or a convex apex (a convex apex having an inner angle equal to or greater than 180 degrees). The judgement is easily performed by calculating an inner product for example. A link pointer is applied to neighbouring apexes. In step SP2, the number of apexes of the polygon is determined. In step SP3, an arbitrary convex apex is selected. In step SP4, it is judged whether or not the number of apexes is greater than 3. When it is judged in step SP4 that the number of apexes is greater than 3, in step 5, a triangle is supposed to be cut from the polygon, the triangle is formed by two sides uniting the selected convex apex (hereinafter referred to as the current apex) and a line segment interconnecting the end points of the sides. In step SP6, an apex other than the three apexes constructing the triangle is selected. In step SP7, it is judged whether or not the selected apex exists in the interior of the triangle. When it is judged in step SP7 that the selected apex is exterior to the triangle, in step SP8, it is judged whether or not all apexes except the three apexes constructing the triangle have been judged in the judgement step SP7. When it is judged in step SP8 that some apexes have not undergone judgement in step SP7, in step SP9, another apex is selected, Then the judgement in step SP7 is carried out again.

When it is judged in step SP8 that all apexes have undergone judgement in step SP7, that is, it is judged that no apex exists in the interior of the triangle, in step SP10, the triangle is cut from the polygon. At the same time, the link pointer is changed in correspondence with omitting of the current apex. In step SP11, it is judged whether each apex becomes a concave apex or a convex apex for two apexes which are influenced by cutting the triangle, and the judgement results obtained in step SP1 are renewed based on the judgement results obtained in this step. In step SP12, the number of apexes is decremented by 1. In step SP13, the next convex apex is selected. Then the judgement in step SP4 is carried out again.

When it is judged in step SP7 that the selected apex exists in the interior of the triangle, then the processing in step SP13 is carried out.

When it is judged in step SP4 that the number of apexes is 3, the series of operations are finished because division of the polygon is not required.

When this method is employed, a convex apex is selected among apexes of a polygon which is to be divided, it is judged whether or not another apex exists in the interior of a triangle which is constructed by two sides uniting the selected convex apex and a line segment interconnecting end points of the sides, then the triangle is cut from the polygon when no apex exists in the interior of the triangle. Thereafter, the next convex apex is selected nevertheless the triangle is cut from the polygon, then the series of operations abovementioned are carried out again.

As is apparent from the foregoing, the operations as a whole are simplified and the quantity of data is decreased.

FIGS. 2(A) to 2(F) are diagrams illustrating a specific sample of the polygon division method.

Figure 2:
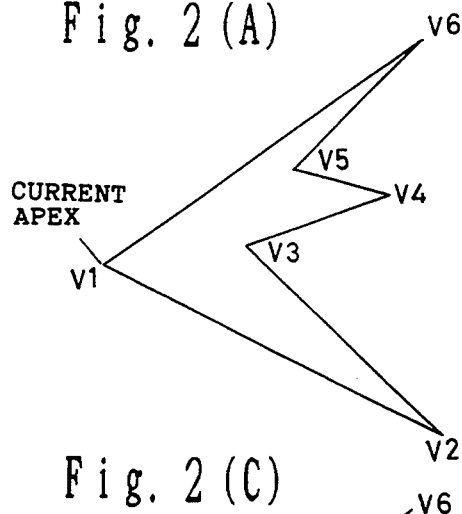
FIGS. 2(A) to 2(F) are diagrams illustrating a specific sample of the polygon division method.
Figure 2:
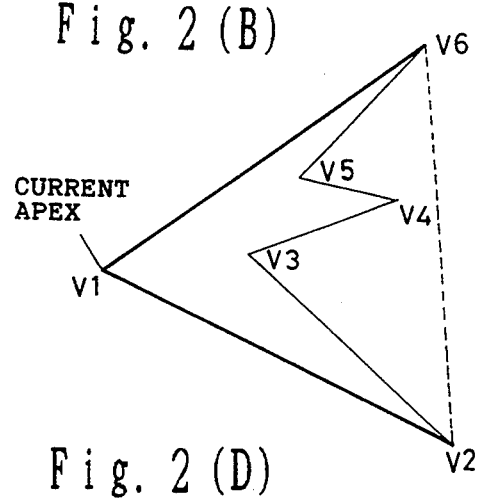
Figure 2:
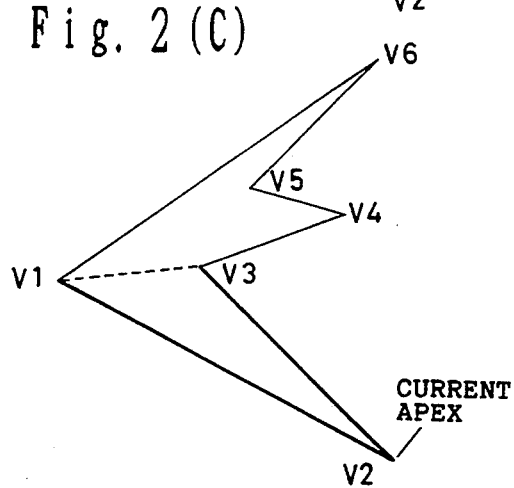
Figure 2:
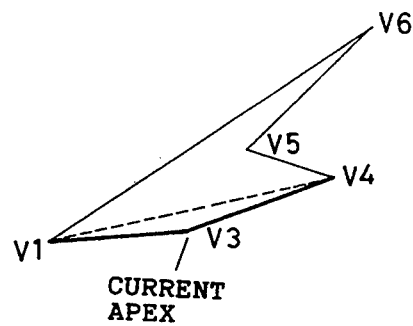
Figure 2:
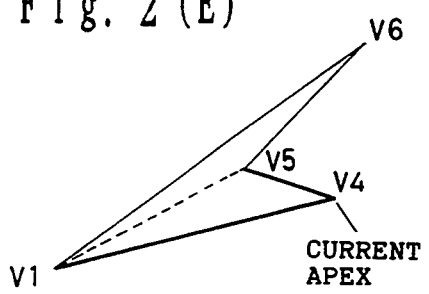
Figure 2:
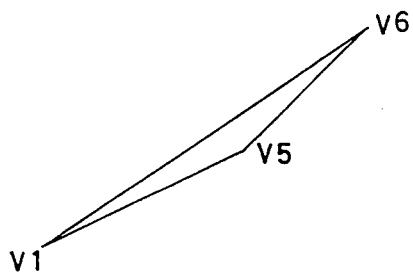
Figure 3:
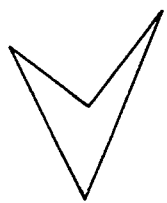
FIGS. 3(A) to 3(F) are diagrams wherein each figure illustrates a polygon which is determined for comparing the division speed of the polygon.
Figure 3:
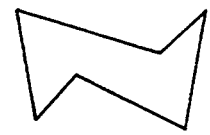
Figure 3:
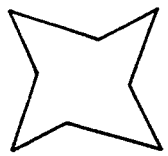
Figure 3:
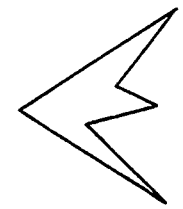
Figure 3:
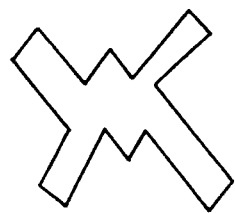
Figure 3:
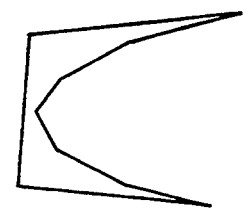
Figure 4:
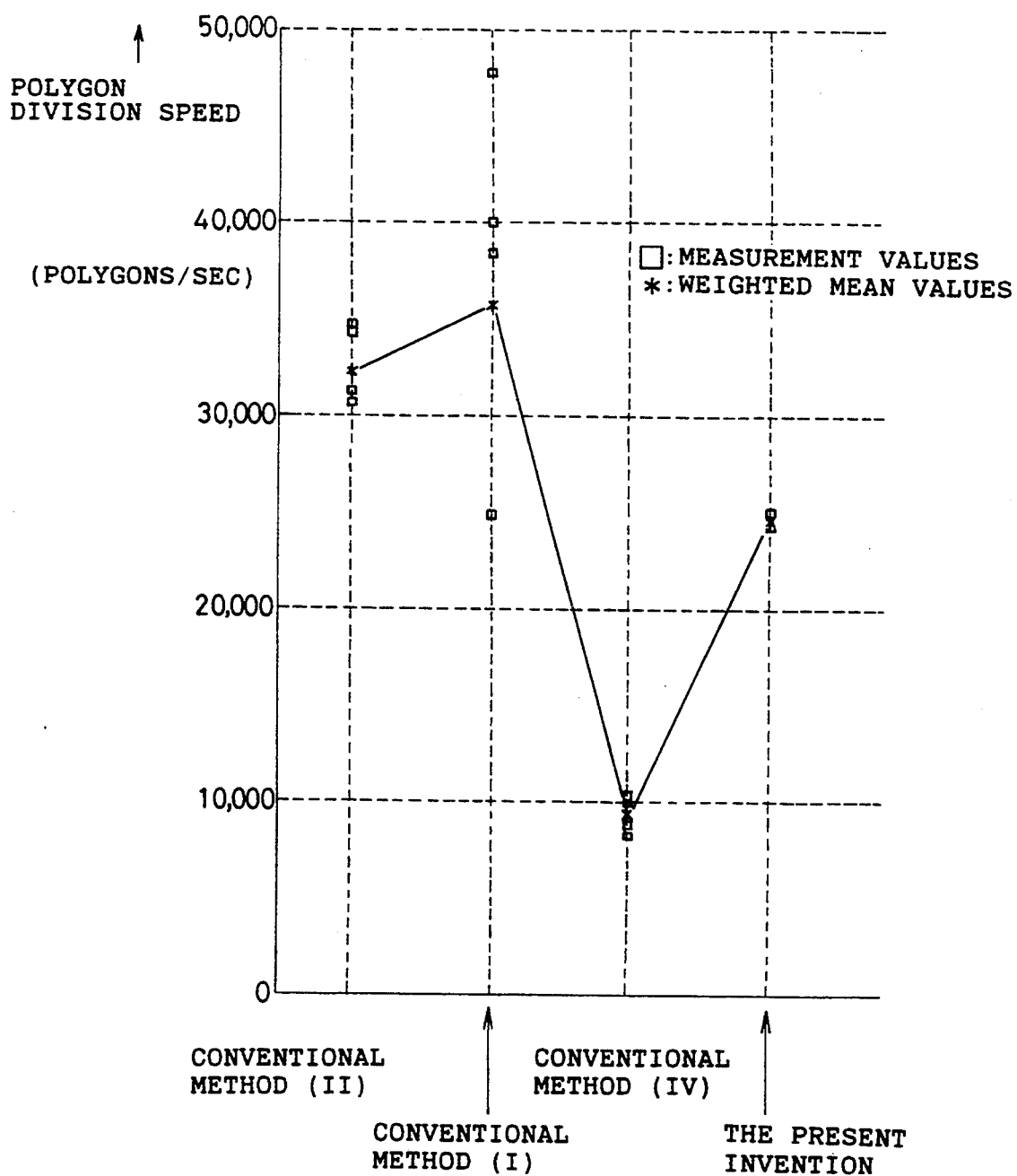
FIGS. 4(A) to 4(F) are diagrams wherein each figure illustrates a division speed of the polygon division method according to the present invention and division speeds of the conventional polygon division methods.
Figure 4:
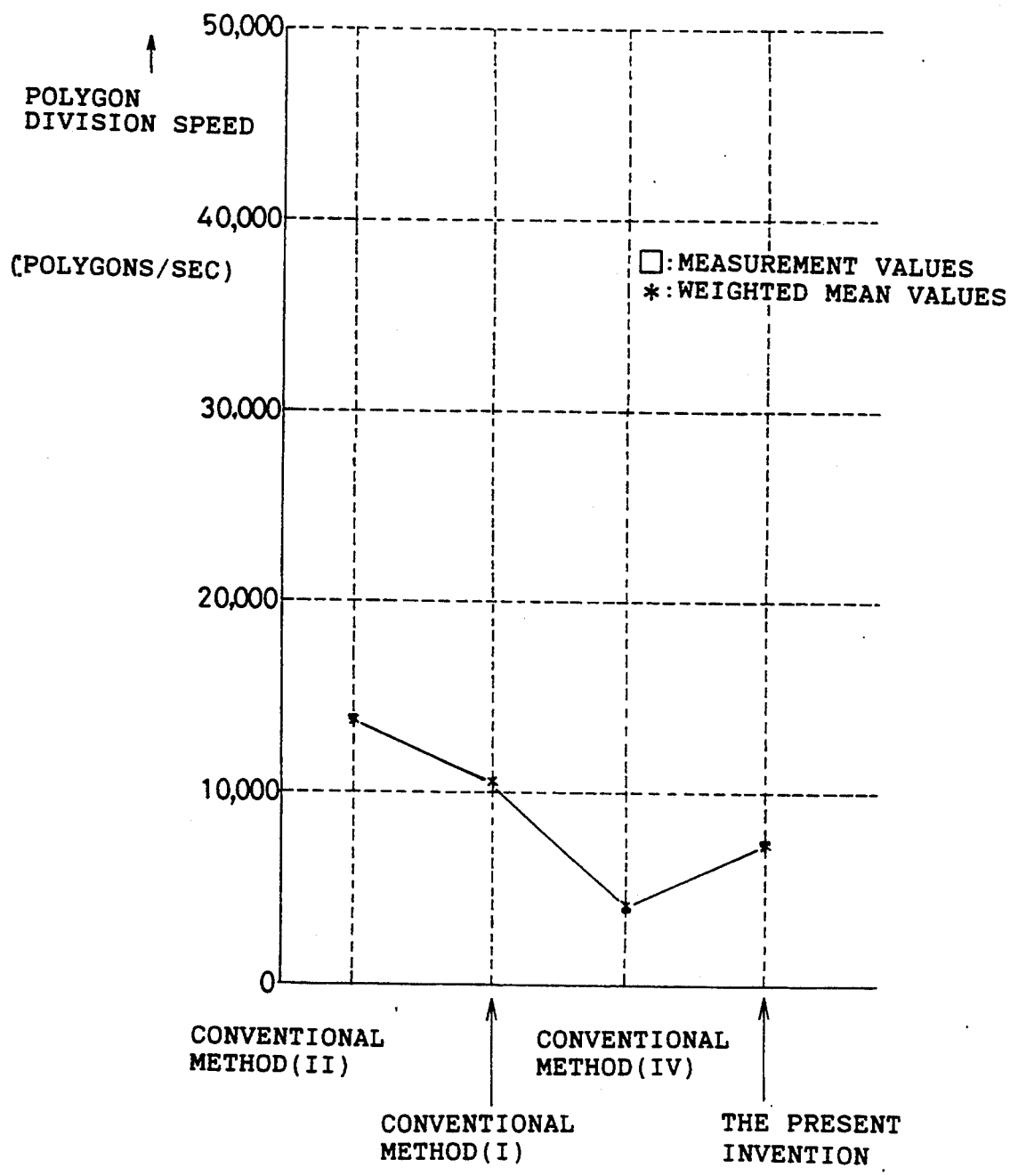
Figure 4:
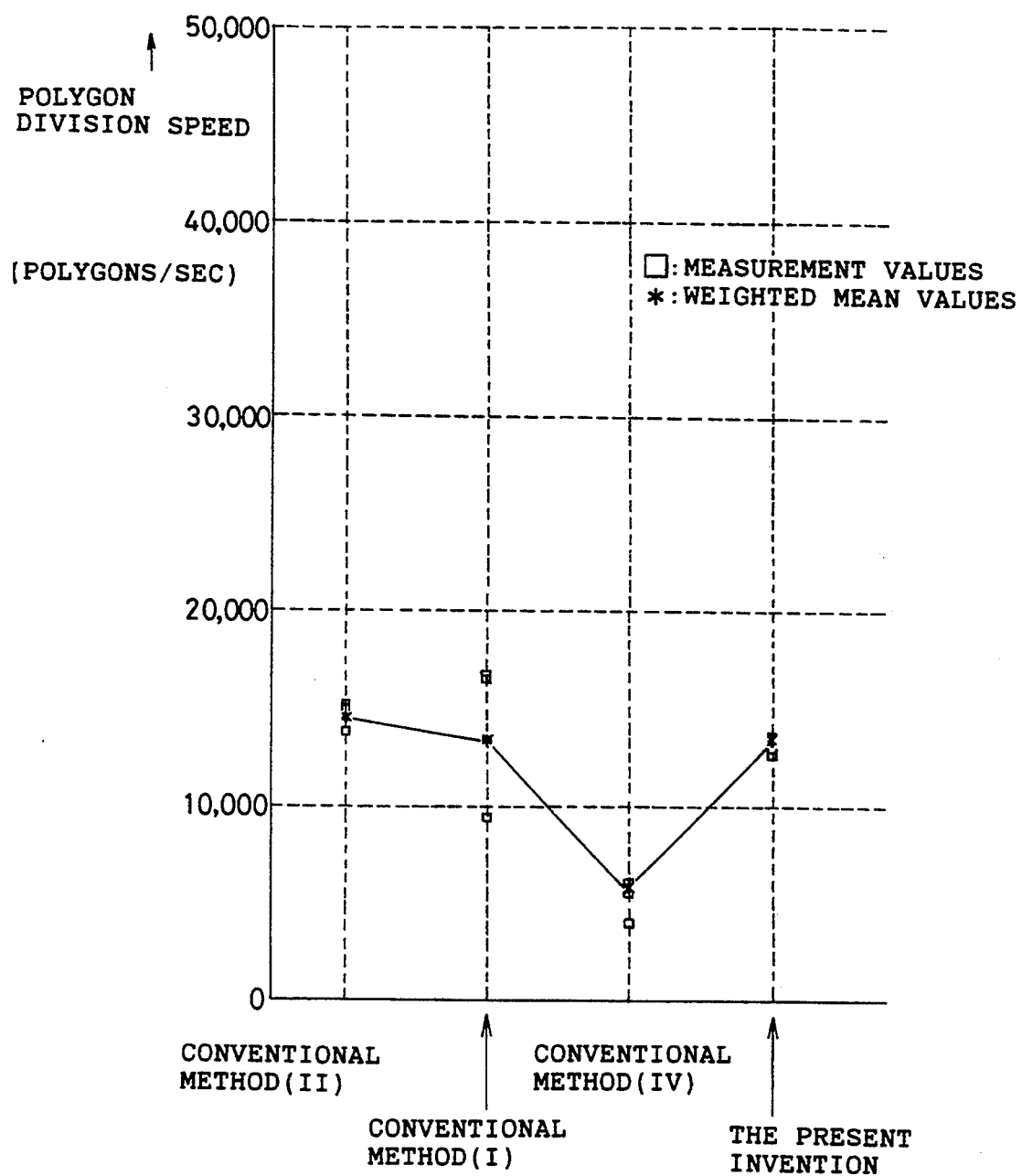
Figure 4:
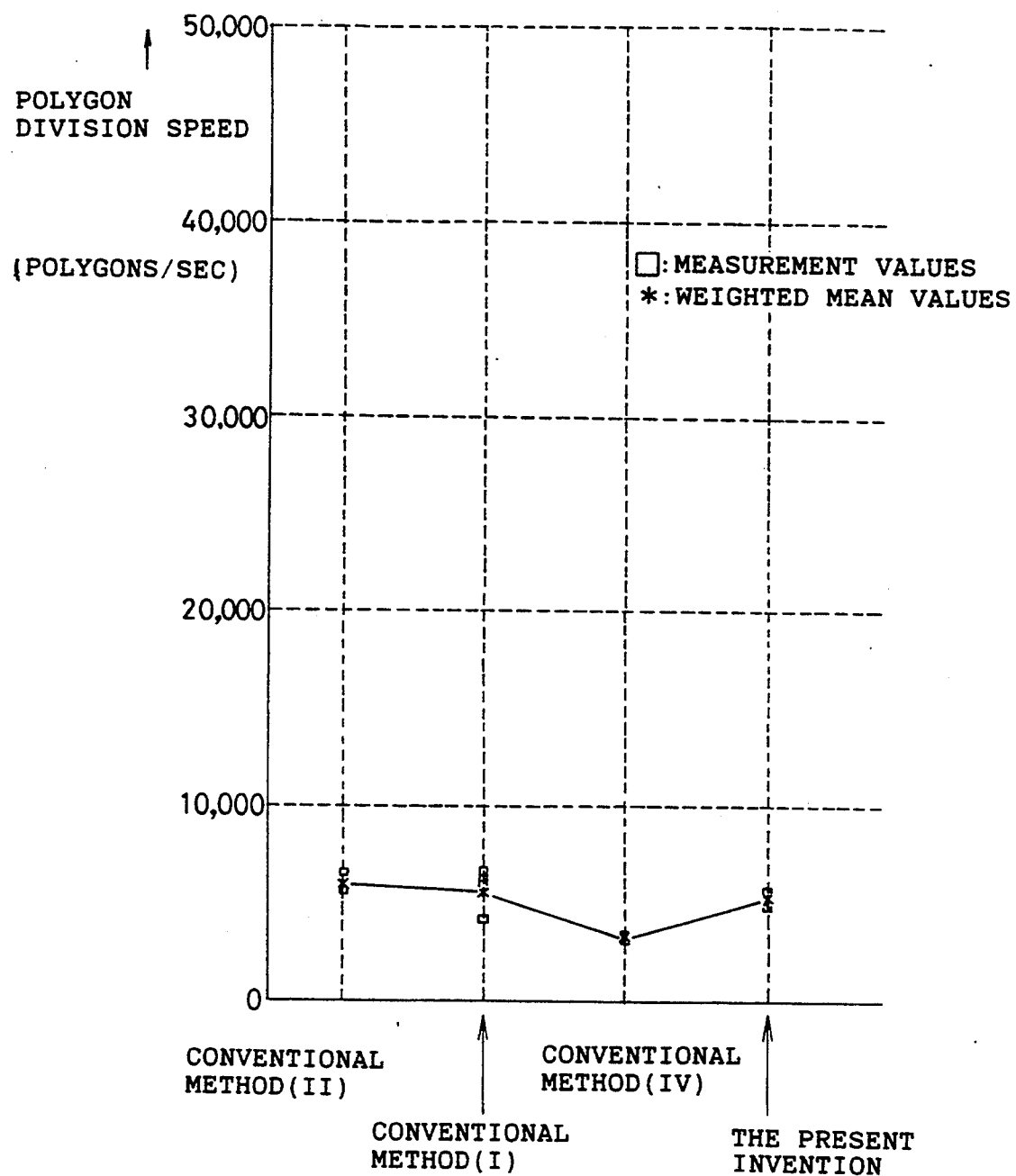

The specific example illustrates the division operations of a polygon which includes six apexes V1 to V6 as is illustrated in FIG. 2(A).

In the polygon illustrated in FIG. 2(A), apexes V1, V2, V4 and V6 are discriminated as convex apexes while apexes V3 and V5 are discriminated as concave apexes. The total number of apexes is 6.

When the apex V1 is selected as the current apex, a triangle constructed by the apexes V6, V1 and V2 (refer to a dashed line in FIG. 2(B)) is supposed to be cut because the number of apexes is greater than 3. Then it is judged whether another apex exists in the interior of the triangle. In this example, the triangle (V6, V1, V2) is not cut from the polygon because the apex V3 exists interior the triangle. The next apex V2 is then selected as the current apex. A triangle constructed by the apexes V1, V2 and V3 (refer to a dashed line in FIG. 2(C)) is supposed to be cut because the number of apexes is greater than 3. Then it is judged whether another apex exists in the interior of the triangle. In this example, the triangle is cut from the polygon because the apexes V4, V5 and V6 exist exterior to the triangle. The apexes V2 and V3 which are influenced by cutting the triangle are judged as to whether each apex is a concave apex or a convex apex. The judgement result corresponding to the apex V3 is renewed and the number of apexes is decremented by 1 because the apex V3 has been varied from a concave apex to a convex apex.

The apex V3 is selected as the current apex. A triangle constructed by the apexes V1, V3 and V4 ( refer to a dashed line in FIG. 2(D)) is supposed to be cut because the number of apexes is 5 and is greater than 3. Then it is judged whether another apex exists in the interior of the triangle. In this example, the triangle (v1, V3, v4) is cut from the polygon because the apexes V5 and V6 exist exterior to the triangle. The apexes V1 and V4 which are influenced by cutting the triangle are judged as to whether each apex is a concave apex or a convex apex. The judgement results corresponding to the apexes V1 and V4 are not renewed and the number of apexes is decremented by 1 because the apexes V1 and V4 have not been varied and are convex apexes.

The apex V4 is selected as the current apex. A triangle constructed by the apexes V1, V4 and V5 ( refer to a dashed line in FIG. 2(E)) is supposed to be cut because the number of apexes is 4 and is greater than 3. Then it is judged whether another apex exists in the interior of the triangle. In this example, the triangle (V1, V4, V5) is cut from the polygon because the apex V6 exists exterior to the triangle. The apexes V1 and V5 which are influenced by cutting the triangle are judged as to whether each apex is a concave apex or a convex apex. The judgement results corresponding to the apexes V1 and V5 are not renewed and the number of apexes is decremented by 1 because the apexes V1 and V5 have not been varied and are convex apexes.

The apex V5 is selected as the current apex. The remaining polygon is not required to be divided because the number of apexes is 3. A triangle constructed by the apexes V1, V5 and V6 ( refer to FIG. 2(F)) is output as it is, then the series of operations is finished.

As is apparent from the foregoing, the method is sufficient to repeat the simple judgements and processings so as to decrease the quantity of a software program. Information necessary for polygon division are sufficient to be little so as to decrease the quantity of data. Specifically, when it is supposed that the maximum number of apexes is determined to 256, each of the coordinate values and color values of an apex are determined as 1 long word which is a type of data having a size of 32 bits, respectively, the method according to the present invention requires a data region with 1800 long words, while the conventional method (II) requires 1801 long words, the conventional method (I) requires 2832 long words and the conventional methods (IV) requires 3982 long words.

When the polygon division speeds of the method according to the present invention and the conventional methods (I), (II) and (IV) are compared based on polygons illustrated in FIGS. 3(A) to 3(F), the obtained polygon division speeds are illustrated in corresponding FIGS. 4(A) to 4(F). The polygon division speed has a dimension of polygons/second. Some polygons are divided based on not only the original shape but also the rotated shape by 90 degrees depending on the shape of the polygon, and weighted mean values of obtained results are illustrated. As is apparent from the measurement results, the method according to the present invention obtains fairly high polygon division speed.

Second Method Embodiment

Figure 5:
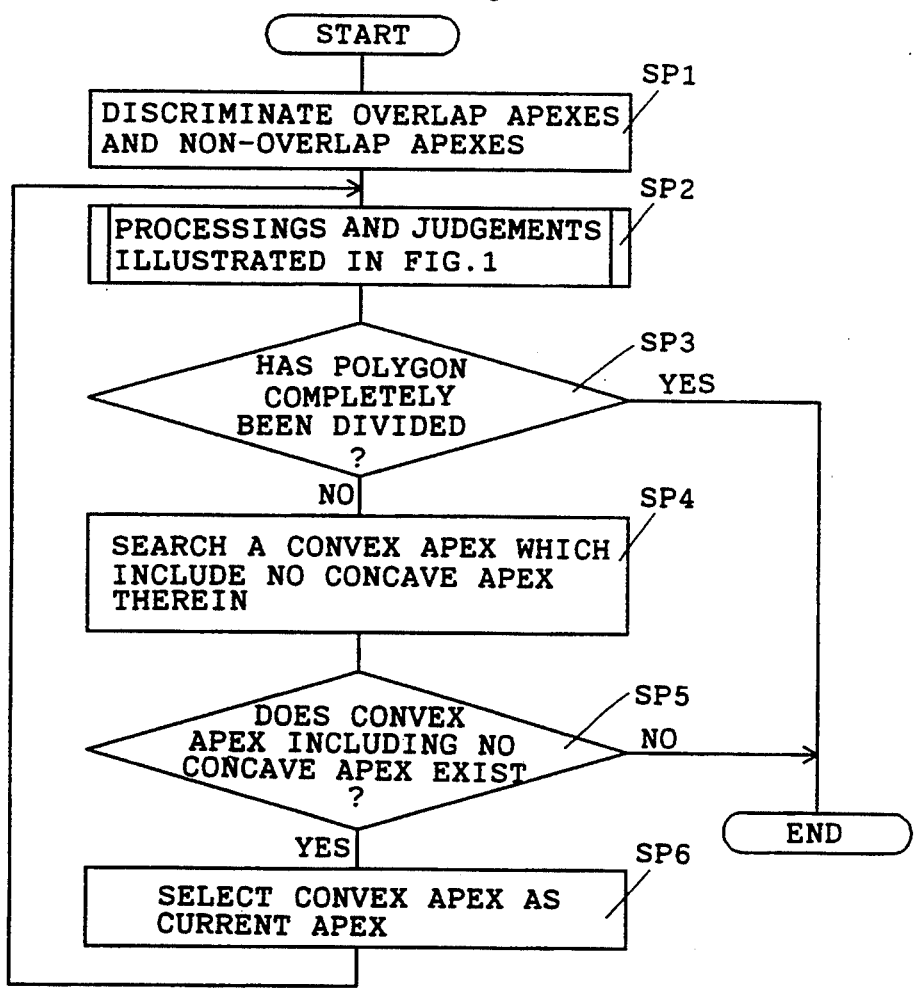
FIG. 5 is a flowchart illustrating a second embodiment of the polygon division method in accordance with the present invention.

FIG. 5 is a flowchart illustrating a second embodiment of the polygon division method in accordance with the present invention.

This method premises that an overlap apex overlapping to another apex is judged as to existence exterior to a triangle which is supposed to be cut.

In step SP1, apexes which overlap another apex and apexes which overlap no apex are discriminated. In step SP2, judgements and processings which are illustrated in the flowchart in FIG. 1 are carried out for the apexes which overlap no apex. In step SP3, it is judged whether or not the polygon has completely been divided into plural triangles. When it is judged in step SP3 that the polygon has incompletely been divided, in step SP4, a convex apex is searched which includes no concave apex therein. In step SP5, it is judged whether or not a convex apex including no concave apex therein exists. When it is judged in step SP5 that a convex apex including no concave apex therein exists, in step SP6, the convex apex is selected as the current apex. Then the processing in step SP2 is carried out again. When it is judged in step SP5, that a convex apex including no concave apex therein does not exist, the series of operations are terminated by deciding that the polygon is a self-interference polygon. When it is judged in step SP3 that the polygon is completely divided, the series of operations are finished.

FIGS. 6(A) to 6(D) are diagrams illustrating a specific sample of the polygon division method.

Figure 6:
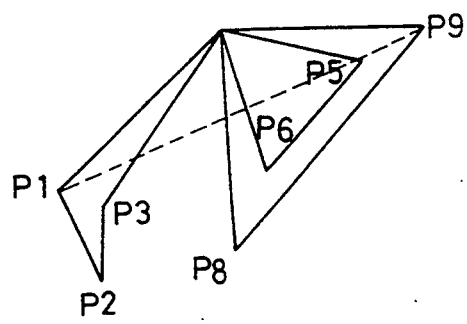
FIGS. 6(A) to 6(D) are diagrams illustrating a specific sample of the polygon division method.
Figure 6:
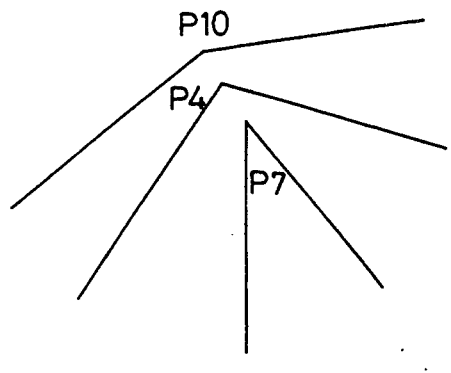
Figure 6:
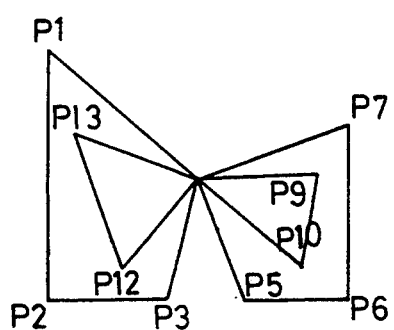
Figure 6:
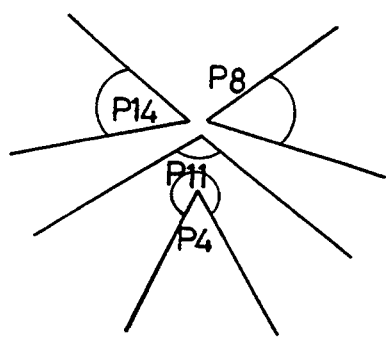

The specific example illustrates the division operations of a polygon which includes ten apexes P1 to P10 as is illustrated in FIG. 6(A).

In the polygon illustrated in FIG. 6(A), apexes P1, P2, PT, P8, P9 and P10 are discriminated as convex apexes while apexes P3, P4, P5 and P6 are discriminated as concave apexes. The apexes P4, P7 and P10 overlap one another. The relationship between the apexes P4, P7 and P10 are determined as is illustrated in FIG. 6(B).

When the apex P10 is selected as the current apex, no other apex exists in the interior of a triangle (P9, P10, P1) (refer to a dashed line in FIG. 6(A)) which is supposed to be cut from the polygon, because this method premises that an overlap apex overlapping to another apex is judged as existing exterior to a triangle which is supposed to be cut. As a result the triangle (P9, P10, P1) seems to be cut from the polygon. But in this embodiment, one of the convex apexes, except overlap apexes, is selected as the current apex, then a triangle is cut from the polygon. In the specific example, one of the apexes P1, P2, P8 and P9 is selected as the current apex, then a triangle is cut from the polygon. Thereby unnatural cutting of a triangle is prevented from occuring.

When a polygon illustrated in FIG. 6(C) is to be divided. The relationship between overlap apexes is illustrated in FIG. 6(D).

When any one convex apex except the overlap apexes is selected as the current apex, a triangle seems impossible to be cut because another apex inevitably exists in the interior of a triangle which is supposed to be cut from the polygon. The method searches a convex apex which includes no concave apex therein among the overlap apexes so as to perform the polygon division without unnatural cutting of triangles.

In this method, information representing the existence or absence of overlap apexes for each apex, increases the quantity of data by about 256 long words when the maximum number of apexes is determined as 256. But this method can divide a self-interference polygon which could not be divided by the conventional methods.

Third Method Embodiment

Figure 7:
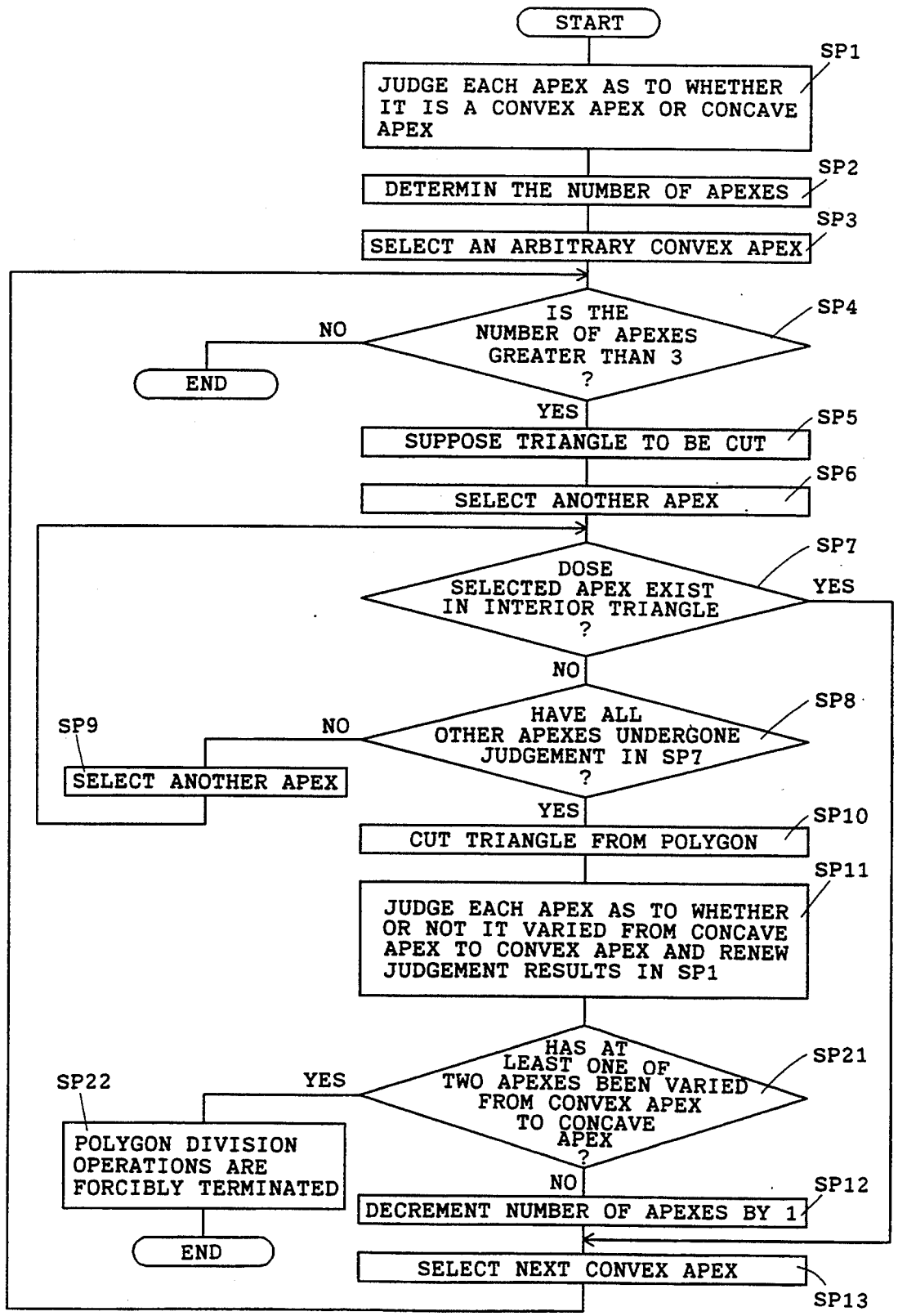
FIG. 7 is a flowchart illustrating a third embodiment of the polygon division method in accordance with the present invention.

FIG. 7 is a flowchart illustrating a third embodiment of the polygon division method in accordance with the present invention.

A difference from the flowchart illustrated in FIG. 1 is that steps SP21 and SP22 are further included between the step SP11 and the step SP12.

In step SP21, it is judged whether or not at least one of two apexes has been varied from a convex apex to a concave apex, the two apexes being influenced by cutting the triangle from the polygon. When it is judged in step SP21 that both apexes have not been varied from a convex apex to a concave apex, then the processing in step SP12 is carried out. On the contrary, when it is judged in step SP21 that at least one apex has been varied from a convex apex to a concave apex, in step SP22, the polygon is discriminated as a self-interference polygon and the series of polygon division operations are forcibly terminated.

Figure 8:
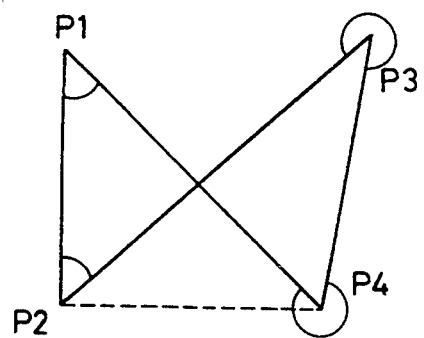
FIGS. 8(A) and 8(B) are diagrams useful in understanding a self-interference polygon detection operation.
Figure 8:
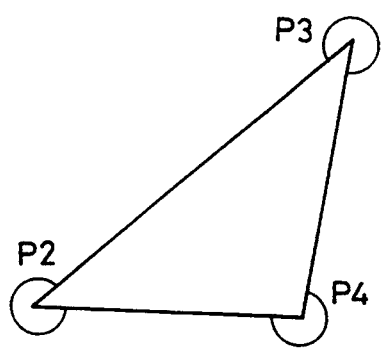

FIGS. 8(A) and 8(B) are diagrams useful in understanding a self-interference polygon detection operation.

When a triangle is cut from a polygon as illustrated in FIG. 8(A) by determining the current apex as the apex P1, the apex P2 becomes a concave apex after cutting the triangle from the polygon as is illustrated in FIG. 8(B) which was a convex apex before cutting the triangle from the polygon. The method simplifies the operations to a great extent in comparison with the case which calculates and obtains a intersection point of the edges based on a given polygon, then judges whether or not the given polygon is a self-interference polygon, because it it sufficient for judging whether or not a polygon is a self-interference polygon that a polygon is judged as to whether or not an apex exists which varies from a convex apex to a concave apex following cutting of a triangle. Division of a self-interference polygon is forcibly terminated. But no disadvantage arises in the method above-mentioned because the self-interference polygon can be filled in any manner which prevents a runaway of a software program from occuring.

First Apparatus Embodiment

Figure 9:
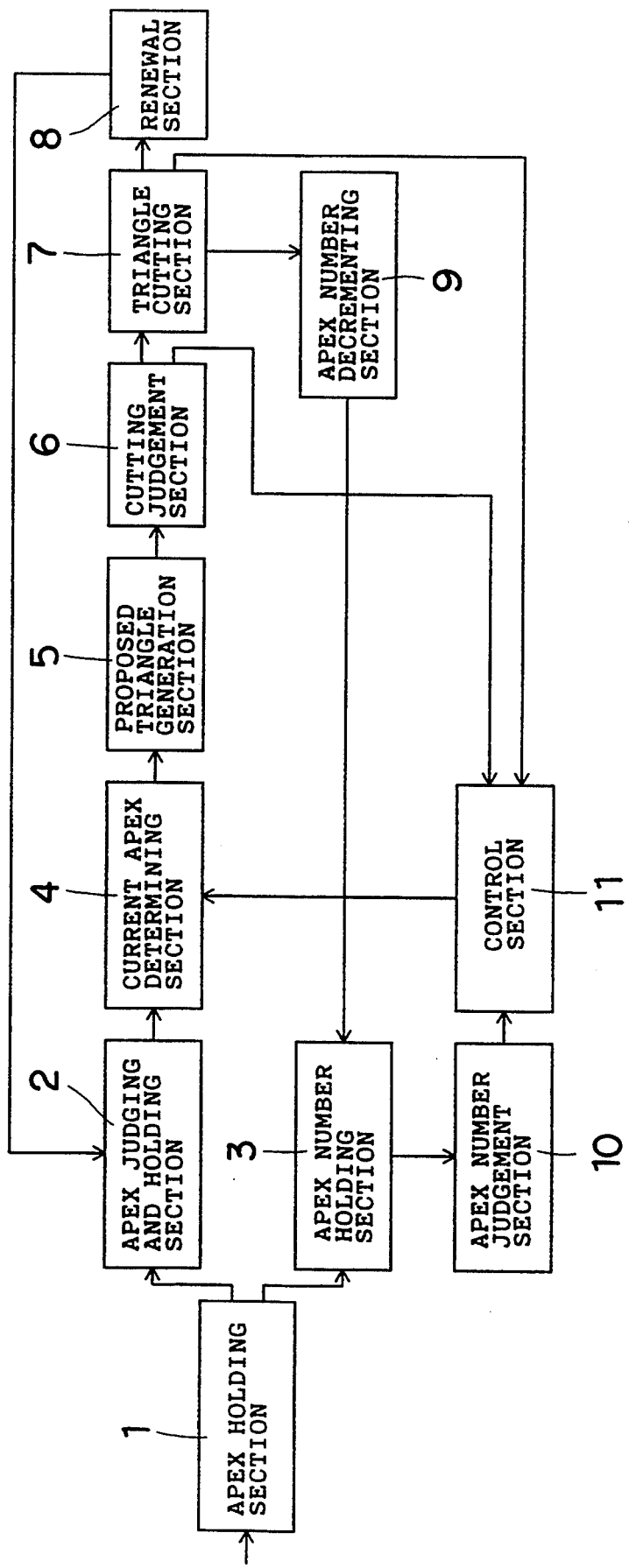
FIG. 9 is a block diagram of a first embodiment of the polygon division apparatus in accordance with the present invention.

FIG. 9 is a block diagram of a first embodiment of the polygon division apparatus in accordance with the present invention, The apparatus includes an apex holding section 1 for holding each apex of a given polygon in a defining order, an apex judging and holding section 2 for judging whether each apex held by the apex holding section 1 is a convex apex or a concave apex and for holding the judgement results, an apex number holding section 3 for holding the number of apexes of the polygon, a current apex determining section 4 for selecting one of the convex apexes which is held by the apex holding section 1 and for determining the selected convex apex as a current apex, a proposed triangle generation section 5 for proposing a triangle which is constructed by two edges uniting the current apex and a line segment interconnecting the ends of the edges, as the proposed triangle to be cut from the polygon, a cutting judgement section 6 for judging whether or not another apex exists in the interior of the proposed triangle, a triangle cutting section 7 for cutting the proposed triangle from the polygon based on the judgement result from the cutting judgement section 6 indicating that no apex exists in the interior of the proposed triangle, a renewal section 8 for judging whether each apex influenced by cutting the proposed triangle is a convex apex or a concave apex, and for renewing the contents of the apex judging and holding section 2 based on the judgement results, an apex number decrementing section 9 for decrementing the number of apexes in the apex number holding section 3 by 1 when the proposed triangle is cut from the polygon, an apex number judgement section 10 for judging whether or not the number of apexes is greater than 3, and a control section 11 for controlling the current apex determining section 4 to select the next convex apex as the current apex when the number of apexes is greater than 3 and when the proposed triangle is cut from the polygon or another apex exists in the interior of the proposed triangle.

In this embodiment, each apex is judged as to whether it is a convex apex or a concave apex by the apex judging and holding section 2 and the judgement results are held by the apex judging and holding section 2 when all apexes of a polygon are held in the defining order by the apex holding section 1. At the same time, the number of apexes of the polygon is held by the apex number holding section 3.

In this condition, one of the convex apexes is selected as the current apex by the current apex determining section 4, a proposed triangle to be cut is generated by the proposed triangle Generation section 5, then it is judged by the cutting judgement section 6 whether or not another apex exists in the interior of the proposed triangle. When it is judged by the cutting judgement section 6 that no apex exists in the interior of the proposed triangle, the proposed triangle is cut from the polygon by the triangle cutting section 7. Because two apexes are influenced by cutting the proposed triangle from the polygon, it is judged whether each apex, after cutting the proposed triangle, is a convex apex or a concave apex by the renewal section 8 and the contents of the apex judging and holding section 2 are renewed by the renewal section 8 based on the judgement results. At the same time, the number apexes in the apex number holding section 3 is decremented by 1 by the apex number decrementing section 9.

When the proposed triangle is cut from the polygon or when it is judged that another apex exists in the interior of the proposed triangle, the control section 11 controls the current apex determining section 4 to select the next convex apex as the current apex depending on the judgement result indicating that the number of apexes is greater than 3. Thereafter, cutting the proposed triangle is repeated based on the newly selected current apex.

As is apparent from the foregoing, dividing a polygon is performed by a simple arrangement and the quantity of data which are necessary for dividing a polygon is decreased.

Second Apparatus Embodiment

Figure 10:
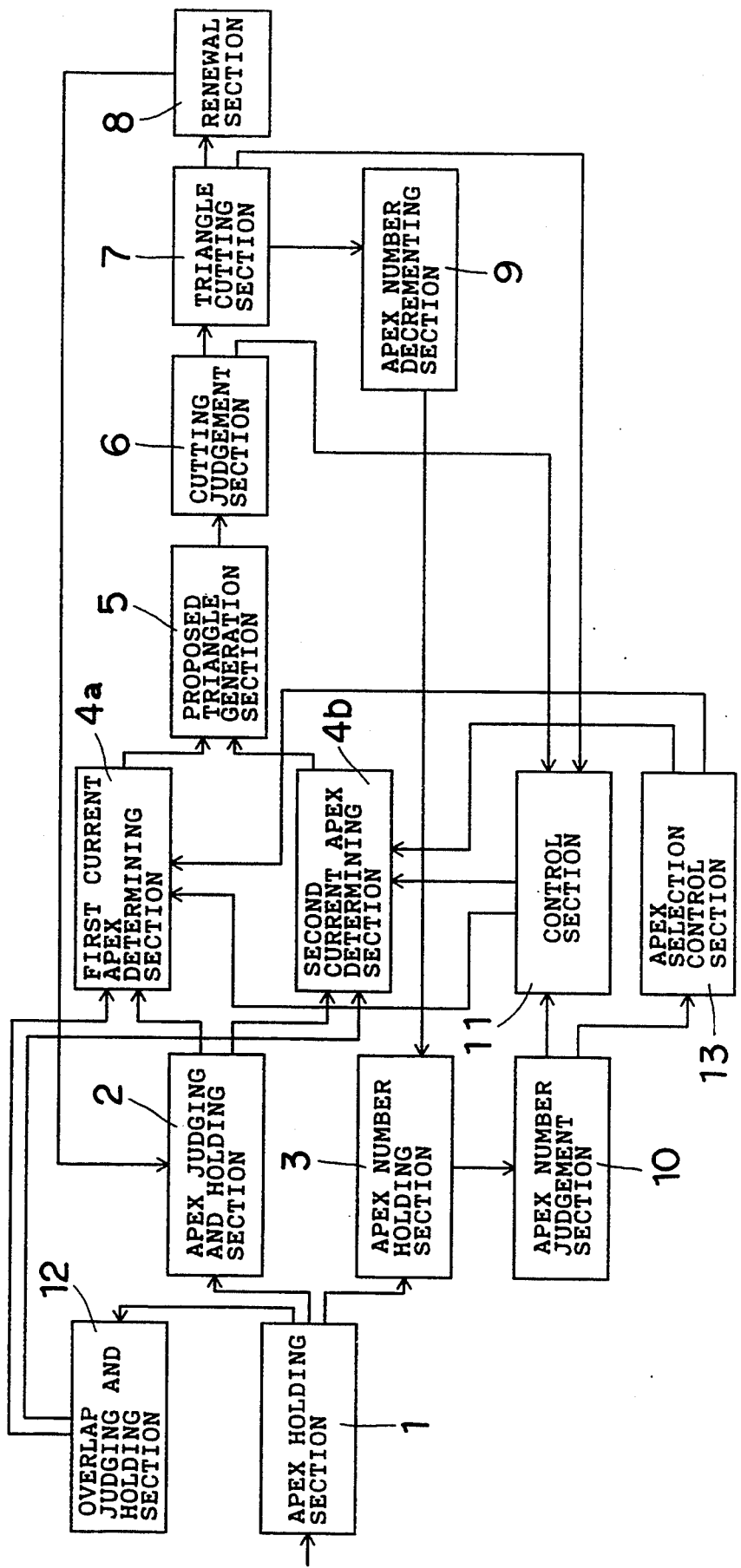
FIG. 10 is a block diagram of a second embodiment of the polygon division apparatus in accordance with the present invention.

FIG. 10 is a block diagram of a second embodiment of the polygon division apparatus in accordance with the present invention.

Differences from the apparatus shown in FIG. 9 are as follows.

(1) An overlap judging and holding section 12 for judging whether or not each apex overlaps another apex and for holding the judgement results, is further included.

(2) A first current apex determining section 4a and a second current apex determining section 4b are provided instead of the current apex determining section 4. The first current apex determining section 4a selects one of convex apexes which do not overlap another apex as the current apex, while the second current apex determining section 4b selects a convex apex which includes no concave apex therein among the apexes which overlap another apex, as the current apex.

(3) An apex selection control section 13 is further included which preferentially operates the first current apex determining section 4a, and operates the second current apex determining section 4b under the condition that the number of apexes is greater than 3 when all corresponding convex apexes have sequentially been selected by the first current apex determining section 4a and the corresponding proposed triangles have been cut from the polygon by the triangle cutting section 7.

In this embodiment, all apexes of a polygon are held by the apex holding section 1 in the defining order of apexes, each apex is judged as to whether a convex apex or a concave apex and the judgement results are held by the apex judging and holding section 2. The number of apexes of the polygon is held by the apex number holding section 3 at the same time. These operations are the same as of the first apparatus embodiment. Also, at the same time, it is judged whether or not each apex overlaps another apex and the judgement results are held by the overlap judging and holding section 12.

In this condition, the apex selection control section 13 preferentially operates the first current apex determining section 4a so as to sequentially select convex apexes which overlap no other apex, and repeats cutting the proposed triangles for the necessary number of times, the series of operations are the same as of the first apparatus embodiment. When the number of apexes becomes 3 after the series of operations are repeated for the necessary number of times, division of the polygon is finished. On the contrary, when the number of apexes is greater than 3 after the series of operations are repeated for the necessary number of times, the apex selection control section 13 operates the second current apex determining section 4b so as to select a convex apex which includes no concave apex therein among overlap apexes. Then, the apex selection control section 13 operates the first current apex determining section 4a so as to repeat cutting the proposed triangle. The division of a degeneracy polygon is performed by repeating the operation of the second current apex determining section 4b and the operation of the first current apex determining section 4a under the condition that the number of apexes is greater than 3 after cutting the proposed triangle.

As is apparent from the foregoing, the apparatus is simplified in its arrangement and the apparatus easily performs division of a degeneracy polygon because it is sufficient to operate the second current apex determining section 4b only when the division of a polygon is not finished by the series of operations which are the same as of the first apparatus embodiment.

It is required to divide a degeneracy polygon into plural triangles completely because a degeneracy polygon is frequently generated by applying a minification operation. This apparatus is a good polygon division apparatus and easily can satisfy the requirement.

Third Apparatus Embodiment

Figure 11:
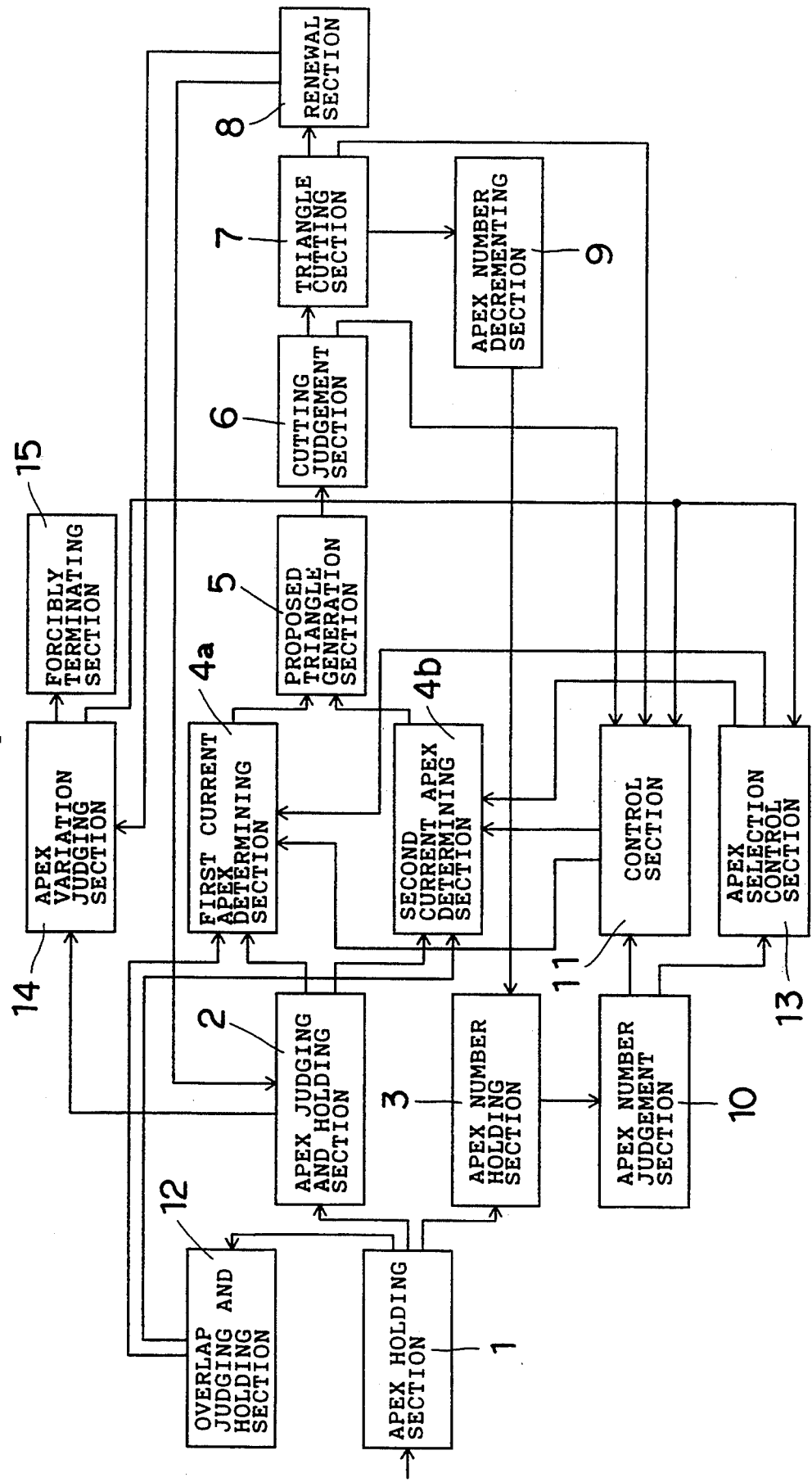
FIG. 11 is a block diagram of a third embodiment of the polygon division apparatus in accordance with the present invention.
Figure 12:
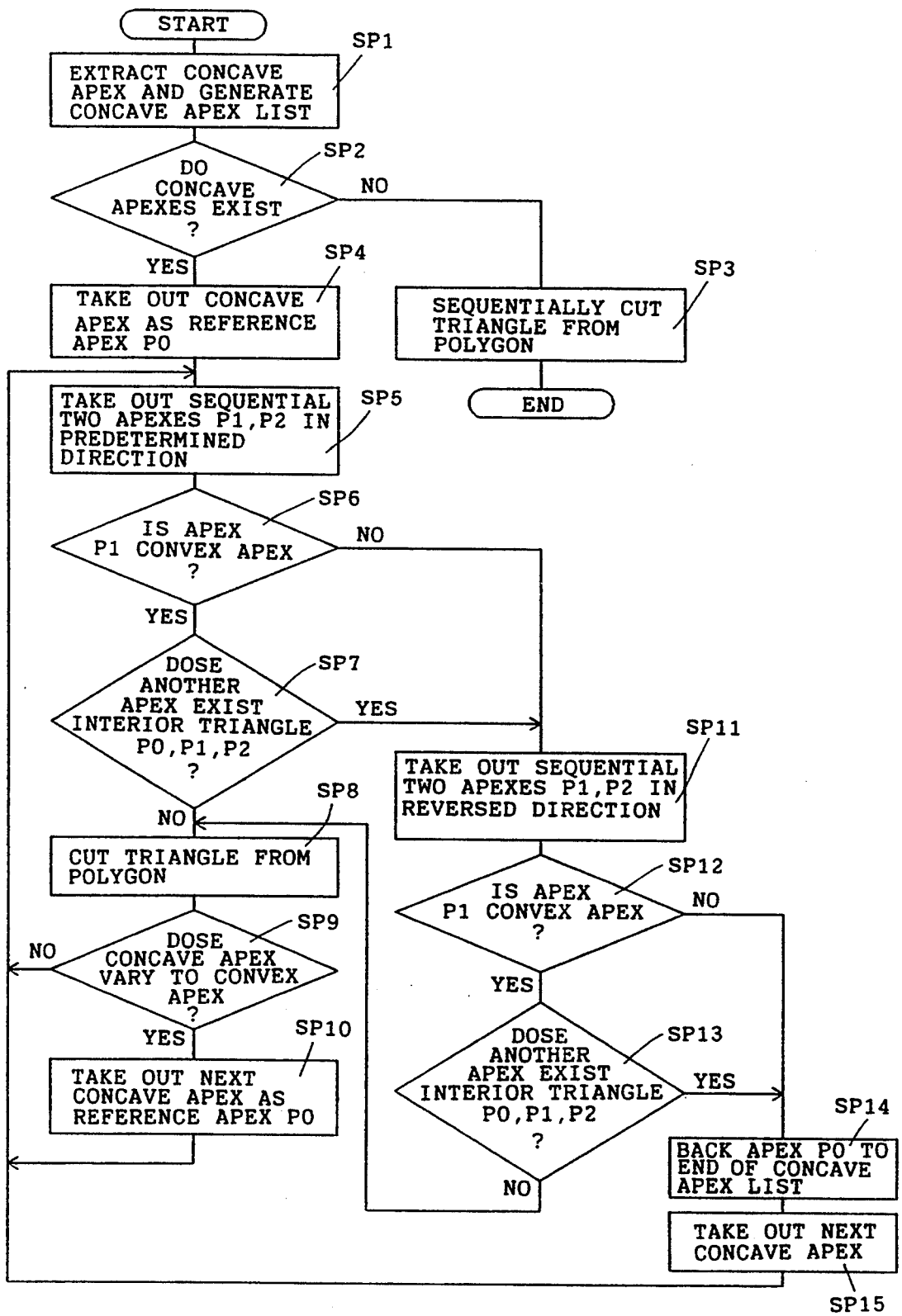
FIG. 12 is a flowchart illustrating the conventional polygon division method (I)
Figure 14:
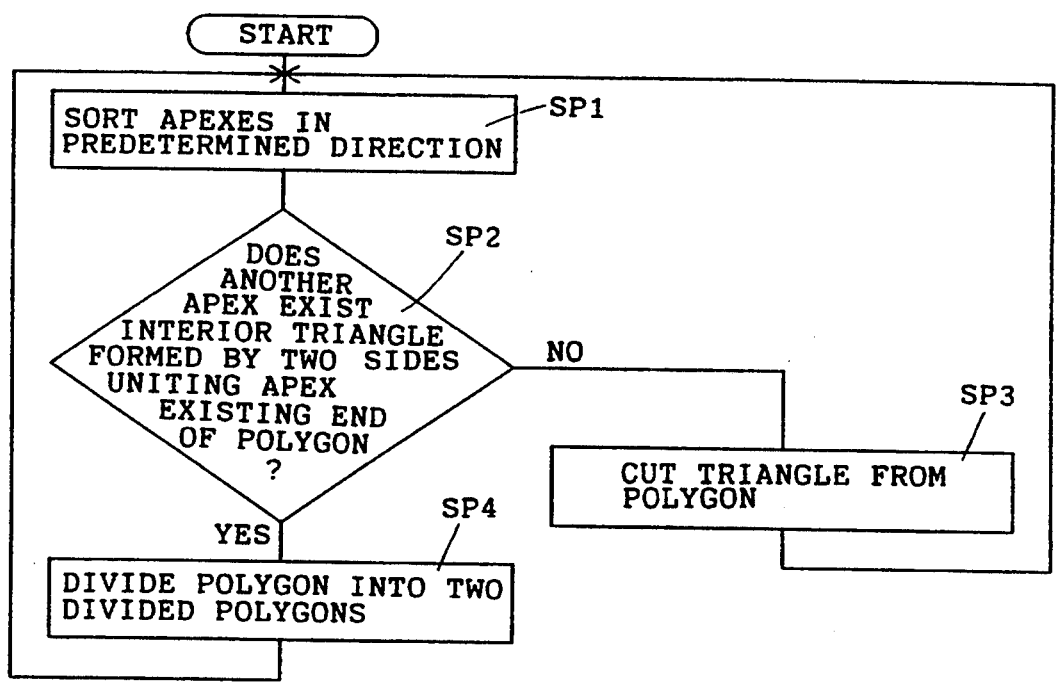
FIG. 14 is a flowchart illustrating the conventional polygon division method (II)
Figure 16:
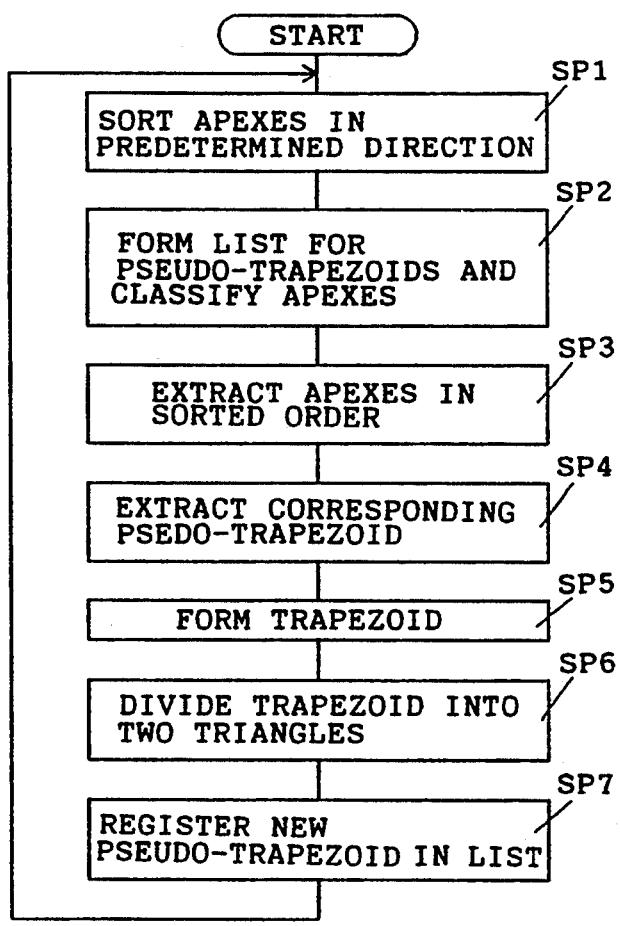
FIG. 16 is a flowchart illustrating the conventional polygon division method (III)
Figure 17:
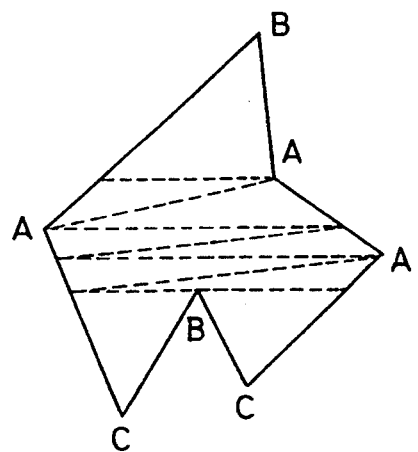
FIG. 17 is a diagram illustrating a specific sample of the conventional polygon division method (Ill)
Figure 18:
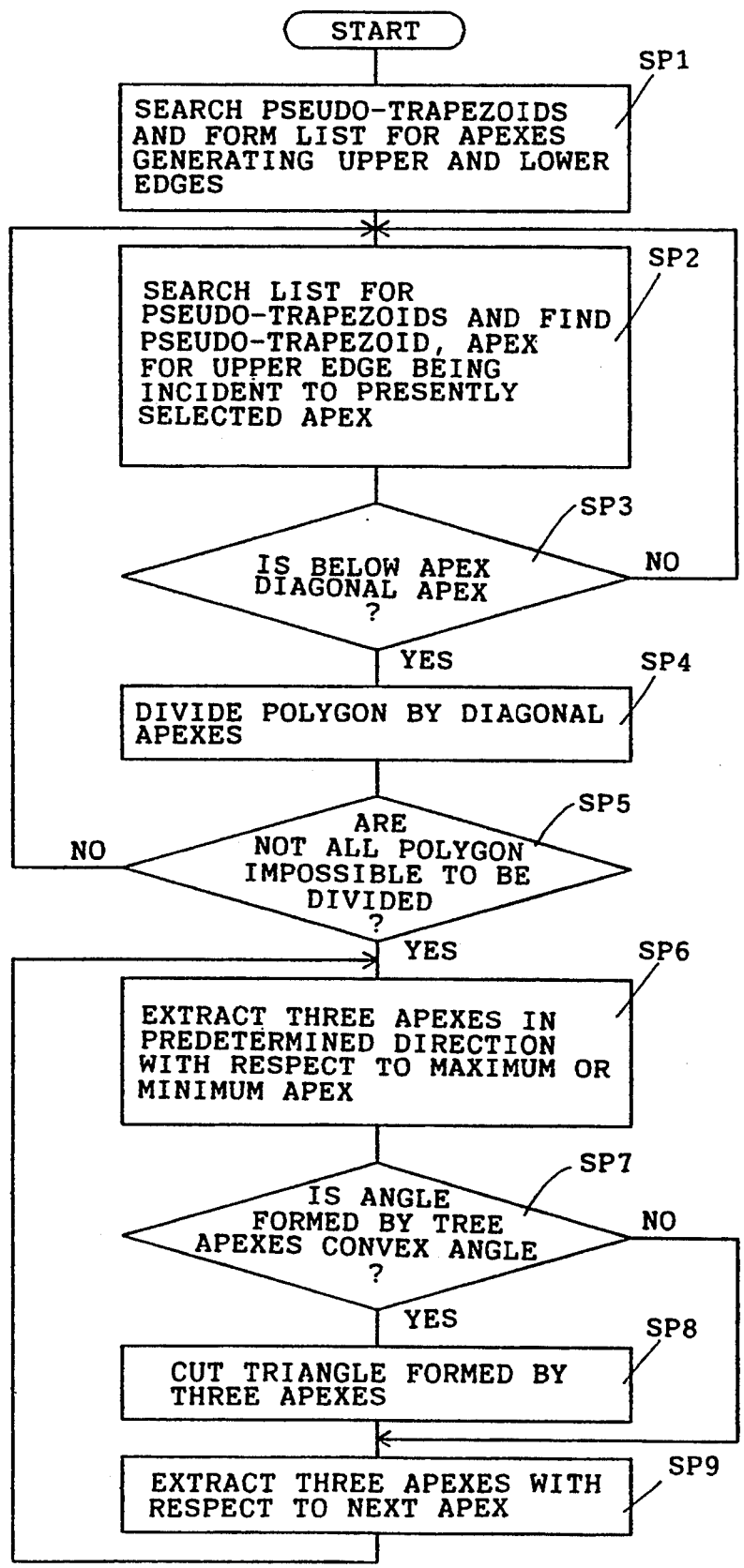
FIG. 18 is a flowchart illustrating the conventional polygon division method (IV)
Figure 20D:
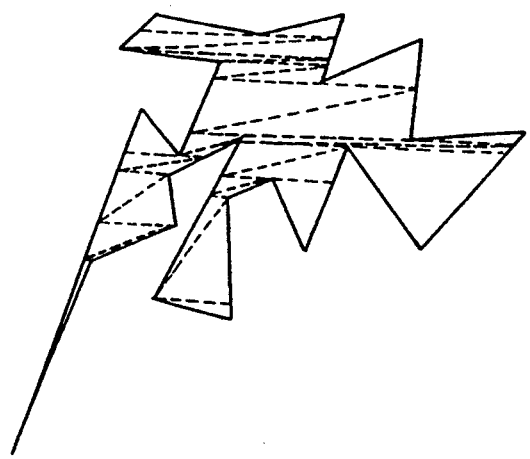
Figure 20E:
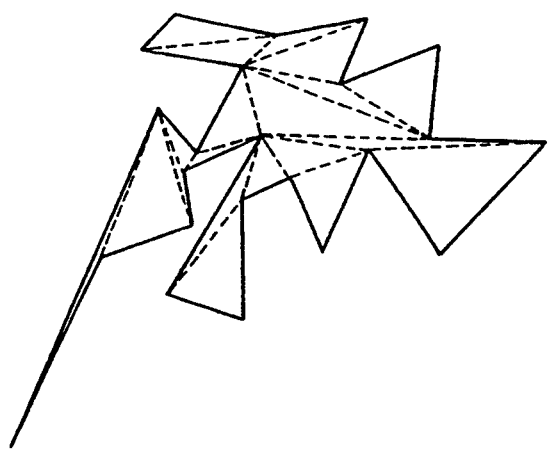

FIG. 11 is a block diagram of a third embodiment of the polygon division apparatus in accordance with the present invention.

Differences from the second apparatus embodiment are as follows.

(1) An apex variation judging section 14 is further included. The apex variation judging section 14 judges whether or not at least one apex has been varied from a convex apex to a concave apex based on the judgement results indicative of each apex being a convex apex or a concave apex, which judgement results are held by the apex judging and holding section 2, and the judgement results of apexes influenced by cutting the proposed triangle, indicative of being a convex apex or a concave apex which judgement results are obtained by the renewal section 8.

(2) A forcibly terminating section 15 forcibly terminates dividing of a polygon based on the judgement result 14 indicating that at least one apex has been varied from a convex apex to a concave apex.

In this embodiment, a polygon is discriminated as a self-interference polygon when at least one apex exists which has been varied from a convex apex to a concave apex following the cutting of the proposed triangle. Then, dividing of the polygon is forcibly terminated by the forcibly terminating section 15. On the contrary, the polygon is completely divided into plural triangles as is done by the second apparatus embodiment when no apex have been varied from a convex apex to a concave apex.

Various modifications and variations will occur to those skilled in the art without departing from the spirit and scope of the invention as defined by the appended claims.

What is claimed is:

1. A polygon division method comprising the steps of:
   judging, for all apexes of a polygon, whether each apex is a concave apex or a convex apex;
   obtaining a total number of apexes of the polygon,
   selecting one convex apex from among all apexes of the polygon to obtain a selected apex;
   judging whether or not another apex is present in an interior of a triangle which is formed by two sides that unite at the selected convex apex and a line segment that interconnects ends of the two sides;
   cutting the triangle from the polygon, decrementing the number of apexes, and selecting another convex apex on a remaining polygon formed by cutting the triangle, when the judgment in said step of judging whether or not another apex is present is that no apex is present in the interior of the triangle; and
   selecting a different convex apex, when the judgment in said step of judging whether or not another apex is present is that another apex is present in the interior of the triangle.

2. A polygon division apparatus comprising:
   apex judging means for judging whether each apex of a polygon is a concave apex or a convex apex;
   apex number holding means for holding a total number of apexes of said polygon;
   first convex apex selection means for selecting one convex apex;
   triangle judging means for judging whether or not another apex is present in an interior of a triangle which is formed by two sides uniting at a convex apex selected by said first convex apex selection means and a line segment interconnecting ends of said sides;
   triangle cutting means for cutting said triangle from said polygon, for decrementing said total number of apexes of said polygon and for selecting another convex apex on a remaining polygon formed by cutting said triangle, based on a judgement result, from said triangle judging means, indicating that no apex is present in said interior of said triangle; and
   second convex apex selection means for selecting a different convex apex based on a judgement result, from said triangle judging means, indicating that another apex is present in said interior of said triangle.

3. A polygon division method comprising the steps of:
   judging, for all apexes of a polygon, whether each apex is a concave apex or a convex apex;
   obtaining a total number of apexes of the polygon;
   detecting apexes which overlap with one another;
   selecting one convex apex of the polygon from apexes other than apexes detected as overlapping to obtain a selected apex;
   judging whether or not another apex is present in an interior of a triangle which is formed by two sides that unite at the selected convex apex and a line segment that interconnects ends of the two sides;
   cutting the triangle from the polygon, decrementing the number of apexes, and selecting another convex apex on a remaining polygon formed by cutting the triangle when the judgment in said step of judging whether or not another apex is present is that no apex is present in the interior of the triangle;
   selecting a different convex apex from among the apexes other than the apexes detected as overlapping when the judgment in said step of judging whether or not another apex is present is that another apex is present in the interior of the triangle;
   when division of the polygon is not completed by selecting convex apexes other than apexes detected as overlapping, selecting an overlapping convex apex which does not include any concave apex therein to obtain a selected overlapping convex apex, judging whether or not another apex is present in an interior of a triangle which is formed by two sides that unite at the selected overlapping convex apex and a line segment that interconnects ends of the two sides and cutting the triangle from the polygon when it is possible to cut the triangle from the polygon; and
   repeating the selecting step for selecting another convex apex and the judging step for judging whether or not another apex is present in the interior of the triangle, or the apex judging step, the detection step for overlap apexes, the convex apex selection step and the judging step for judging whether or not another apex is present in the interior of the triangle for the remaining polygon.

4. A polygon division apparatus comprising:
   apex judging means for judging whether each apex of a polygon is a concave apex or a convex apex;
   apex number holding means for holding a total number of apexes of said polygon;
   detection means for detecting overlap apexes which overlap one another;
   first convex apex selection means for selecting one convex apex of the polygon, other than one of the overlap apexes;
   triangle judging means for judging whether or not another apex is present in an interior of a triangle which is formed by two sides uniting at a convex apex selected by said first convex apex selection means and a line segment interconnecting ends of said sides;
   triangle cutting means for cutting said triangle from said polygon, for decrementing said total number of apexes of said polygon, and for selecting another convex apex on a remaining polygon formed by cutting said triangle based on a judgement result, from said triangle judging means, indicating that no apex is present in said interior of said triangle;

second convex apex selection means for selecting a different convex apex based on a judgement result, from said triangle judging means, indicating that another apex is present in said interior of said triangle; and overlap apex selection means for selecting a convex apex which includes no concave apexes and for operating a judging operation by said triangle judging means when convex apexes other than said overlap convex apexes have been sequentially selected and said polygon remains incompletely divided.

5. A polygon division method comprising the steps of:

judging whether or not an apex, which has varied from a convex apex to a concave apex during every triangle cutting operation to a polygon, is present;

continuing division of the polygon when judging that no apex which has varied from a convex apex to a concave apex is present; and terminating division of the polygon when judging that an apex which has varied from a convex apex to a concave apex is present.

6. A polygon division apparatus comprising:

apex judging means for judging whether each apex of a polygon is a concave apex or a concave apex;

apex number holding means for holding a total number of apexes of said polygon;

convex apex selection means for selecting one convex apex from among all apexes of said polygon;

triangle judging means for judging whether or not another apex is present in an interior of a triangle which is formed by two sides uniting at a convex apex selected b said convex apex selection means and a line segment interconnecting ends of said sides;

triangle cutting means for cutting said triangle from said polygon and for decrementing said total number of apexes of said polygon based on the judgement results, from said triangle judging means, indicating that no apex is present in said interior of said triangle;

varied apex judging means for judging whether or not an apex has varied from a convex apex to a concave apex during every cutting of a triangle from said polygon;

first repetition control means for repetitively operating said apex judging means, said apex number holding means, said convex apex selection means and said triangle judging means for a remaining polygon which is formed by cutting said triangle from said polygon, based on a judgement result, from said varied apex judging means, indicating that no apex is present which has varied from a convex apex to a concave apex;

second repetition control means for repetitively operating said convex apex selection means and said triangle judging means based on a judgement result, from said triangle judging means, indicating that another apex is present in an interior of said triangle of said polygon; and terminating means for terminating division of said polygon based on a judgement result, from said varied apex judging means, indicating that an apex which has varied from a convex apex to a concave apex is present.

* * * * *